US008060652B2

(12) United States Patent
Eller

(10) Patent No.: US 8,060,652 B2
(45) Date of Patent: *Nov. 15, 2011

(54) EXTENSIBLE BINARY MARK-UP LANGUAGE FOR EFFICIENT XML-BASED DATA COMMUNICATIONS AND RELATED SYSTEMS AND METHODS

(75) Inventor: Bill J. Eller, Greenville, TX (US)

(73) Assignee: L-3 Communicatins Integrated Systems L.P., Greenville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/803,867

(22) Filed: Jul. 8, 2010

(65) Prior Publication Data

US 2010/0281182 A1 Nov. 4, 2010

Related U.S. Application Data

(63) Continuation of application No. 10/864,773, filed on Jun. 9, 2004, now Pat. No. 7,769,904.

(51) Int. Cl.
*G06F 15/16* (2006.01)
(52) U.S. Cl. ........ 709/246; 709/227; 715/513; 715/523; 375/240
(58) Field of Classification Search .................... 709/246
See application file for complete search history.

(56) References Cited

U.S. PATENT DOCUMENTS 6,005,503 A * 12/1999 Burrows .......................... 341/67

(Continued)

FOREIGN PATENT DOCUMENTS

EP 1076459 2/2001

OTHER PUBLICATIONS

Sundaresan, Neel; Moussa, Reshad, "Algorithms and Programming Models for Efficient Representation of XML for Internet Applications", May 1-5, 2001, ACM 1-58113-348-0/01/0005, p. 366-375.*

(Continued)

*Primary Examiner* — Rupal Dharia
*Assistant Examiner* — Hua Fan
(74) *Attorney, Agent, or Firm* — O'Keefe, Egan, Peterman & Enders, LLP

(57) ABSTRACT

An extensible binary mark-up language is disclosed that is compatible with existing XML standards yet provides significantly improved efficiencies for XML-based data storage and communications, particularly for narrow and low bandwidth communication media. A corresponding extensible non-binary mark-up language is also disclosed that is compatible with the XML standard. This dual-representation common message format (CMF) allows standard XML tools to be utilized in viewing and editing XML-based data and allows a CMF parser to be utilized to convert the XML formatted information into an extensible binary representation for actual communication through a medium or storage on a wide range of media. Advantages include a very compact, yet flexible and extensible binary data representation (CMF-B) for a corresponding extensible mark-up language (CMF-X), a data packaging scheme that allows for the effective transport of XML-based data over existing data channels, including narrow-bandwidth channels that utilize existing network protocols, and a CMF parser that allows for seamless conversion between CMF-B and CMF-X.

18 Claims, 3 Drawing Sheets

U.S. PATENT DOCUMENTS

| | | | |
|---|---|---|---|
| 7,043,686 B1 * | 5/2006 | Maruyama et al. | 715/242 |
| 7,500,017 B2 | 3/2009 | Cseri et al. | 709/246 |
| 7,769,904 B2 | 8/2010 | Eller | 709/250 |
| 2003/0046317 A1 * | 3/2003 | Cseri et al. | 707/513 |

OTHER PUBLICATIONS

D Vint Production, "XML Schema—Data Types Quick Reference", Jan. 2003, D Vint Production, p. 1-2.*

Sundaresan, Neel & Moussa, Reshad, "Algorithms and Programming Models for Efficient Representation of XML for internet Applications," *WWW10*, May 15, 2001, Hong Kong, pp. 366-375.

WAP Binary XML Content Format—Version 16-Jun. 1999; "Wireless Application Protocol, Binary SML Content Format Specification, Version 1.1," Wireless Application Protocol Forum, Ltd 1998, 1999, pp. 1-21.

Polastre, Joe, "IBM Corporation, Binary SML Tokenization Specification, Version 1.0,", Binary XML Content Format—Dec. 27, 1999; pp. 1-13.

Moore, Richard, "XBL Extensible Binary Language," Extensible Binary Format—Obtained from Internet May 18, 2004, pp. 1-4, (apparently posted Apr. 2001).

D. Vint Productions, "*XML Schema—Data Types Quick Reference,*" Jan. 2003, D. Vint Production, pp. 1-2.

Shankar Pal et al., "*A Case Against Standardizing Binary Representation of XML,*" Binary Interchange Workshop, 2003.

* cited by examiner

US 8,060,652 B2

EXTENSIBLE BINARY MARK-UP LANGUAGE FOR EFFICIENT XML-BASED DATA COMMUNICATIONS AND RELATED SYSTEMS AND METHODS

RELATED APPLICATIONS

This application is a continuation application of the following application: U.S. patent application Ser. No. 10/864,773 which was filed on Jun. 9, 2004 now U.S. Pat. No. 7,769,904 and is entitled "EXTENSIBLE BINARY MARK-UP LANGUAGE FOR EFFICIENT XML-BASED DATA COMMUNICATIONS AND RELATED SYSTEMS AND METHODS," which is hereby expressly incorporated by reference in its entirety.

NOTICE OF COPYRIGHT

A portion of this patent document contains material which is subject to a copyright protection. The copyright owner has no objection to the reproduction by anyone of the patent disclosure, as it appears in the Patent and Trademark Office patent files or records, but otherwise reserves all copyright rights whatsoever.

TECHNICAL FIELD OF THE INVENTION

This invention relates to the transmission of data across communications media, and more particularly to methods and architectures for communicating XML-based data files.

BACKGROUND

Transmitted information for current computer systems is often formatted using the extensible mark-up language (XML) standard. The XML standard provides a powerful and efficient language through which to communicate a wide range of data and information in a standard format that can be recognized across a wide variety of different computing platforms. As such, XML provides a flexible and common framework for improving compatibility of data transfer between systems. One significant disadvantage to XML, however, is that the XML standard was not designed for communication efficiency, which is needed in certain environments such as narrow or limited bandwidth channels. The relative inefficiency of communicating XML-formatted data, therefore, causes problems with devices such as cell phones, dial-up modems, and other low or narrow bandwidth systems.

FIG. 1 (prior art) provides a block for a prior art system in which XML formatted data is communicated through a network. Block 104 represents an XML formatted document, data or information that is to be communicated by one system to another through a network 102 and reconstructed or received as XML formatted document, data or information, as represented by block 106. The network 102 can be made up of any of a wide variety of communications systems and devices, both wired and wireless, that ultimately provide communication connectivity between two systems. As shown in FIG. 1, the defined technique for communicating this XML formatted document 104 is to represent the text as ASCII or Unicode data words, to transmit this ASCII or Unicode data from a first system through the network as represented by line 108, and to receive this ASCII or Unicode data from the network by a second system as represented by line 110.

The ASCII and Unicode standards are two well-known textual coding schemes for representing text characters as sets of binary bits. The ASCII standard provides an 8-bit data byte that represents a character set of 256 commonly used characters, including the alpha-numeric and punctuation symbols. The Unicode standard basically provides an extension of ASCII with similar encoding but additional 8-bit bytes representing additional characters for coverage of languages other than English to include Japanese, Chinese, and numerous other languages and lexicons. As with typical textual encoding schemes, ASCII and Unicode possess inherent inefficiencies in that they are limited in range and extension by their encoding scheme. For example, typical textual formats, such as ASCII, use fixed bit fields which are not easily extended. They are also extremely inefficient methods for the encoding of numbers in that each numerical digit as well as included decimal points each consume at least 8-bits. Additionally transmission systems typically use inflexible fixed bit messages or field groups. Changes to such formats are also time consuming and costly in terms of labor, shipping and installation. In addition, in fixed bit message or field grouping constructs many dependencies often exist between fields (e.g., separate accuracy, multiplier, unit, and overlay field indicators). To reduce bandwidth requirements to transmit typical binary encoded data, data is often manipulated in scale, units, etc. to reduce the total fixed bits for the transmission. The disadvantage is that this reduction in fixed bits typically results in loss of accuracy from the measurement initially generated by the producing device.

Previous efforts have existed to provide a binary XML content format. One such effort is called Wireless Application Protocol Binary XML (WBXML). This WBXML specification defines a compact binary representation of XML. This binary XML content format is designed to reduce the transmission size of XML documents, allowing more effective use of XML data on narrowband communication channels. The binary format is also designed to allow for compact transmission with no loss of functionality or semantic information. The format is designed to preserve the element structure of XML, allowing a browser to skip unknown elements or attributes. The binary format encodes the parsed physical form of an XML document, i.e., the structure and content of the document entities. Meta-information, including the document type definition and conditional sections, is removed when the document is converted to the binary format. Unfortunately, the WBXML content format does not adequately define a binary XML solution that achieves needed user and operational requirements. For example, the WBXML structure utilizes a number of less efficient or less extensible encoding approaches such as inclusion of null bytes to indicate the end of string values; inclusion of a string table in the binary transmission instance; and use of fixed tokenization with code spaces, code pages, and end tokens to replicate the textual structure of XML into the WBXML binary representation.

One other approach attempted to generate binary formatting through the tokenization of tags and attribute names, as described in published U.S. Patent Application No. 2003/0046317A1, which is entitled "Method and System for Providing an XML Binary Format." The encoding approach described in this published application concentrates on the minimization of processing time and thus also utilizes a number of less space efficient or less extensible encoding methods and structures. Such undesirable methods and structures include a requirement for a pre-defined fixed set of tokens, inclusion of a length value to indicate the number of characters in all strings, and inclusion of END tokens.

SUMMARY OF THE INVENTION

The present invention provides an extensible binary mark-up language that is compatible with existing XML standards yet provides significantly improved efficiencies for XML-based data communications, particularly for narrow and low bandwidth communication media. The present invention also provides a corresponding extensible non-binary mark-up language that is compatible with the XML standard. This dual-representation common message format (CMF) provided by the present invention allows standard XML tools to be utilized in viewing and editing XML-based data and allows a CMF parser to be utilized to convert the XML formatted information into an extensible binary representation for actual communication through a medium. The present invention thereby provides a flexible and extensible binary data representation (CMF-B) for a corresponding extensible mark-up language (CMF-X), a data packaging scheme that allows for the effective transport of XML-based data over existing data channels, including narrow-bandwidth channels that utilize existing network protocols, and a CMF parser that allows for seamless conversion between CMF-B and CMF-X, as desired.

In one embodiment, the present invention is a method for transmitting data formatted in an extensible markup language (XML), including providing a dual-representation format parser for converting between an extensible markup language (XML) representation that is compatible with standard XML and an extensible binary representation that is configured to reduce a number of bits required to represent common data as compared to the XML representation, accessing an XML representation of data according to a document type definition (DTD), parsing the XML representation to generate a binary representation of the data according to the DTD, and transmitting the binary representation.

In another embodiment, the present invention is a system for transmitting data formatted in an extensible markup language (XML), including a parser configured to convert from an extensible markup language (XML) representation that is compatible with standard XML to an extensible binary representation that is configured to reduce a number of bits required to represent common data as compared to the XML representation where the XML representation and the binary representation is defined according to document type definition (DTD), and a communication interface coupled to the parser and configured to transmit the binary representation through a medium. Similarly, the present invention is also a system for receiving data formatted in an extensible markup language (XML), comprising: a parser configured to convert to an extensible markup language (XML) representation that is compatible with standard XML from an extensible binary representation that is configured to reduce a number of bits required to represent common data as compared to the XML representation where the XML representation and the binary representation being defined according to a document type definition (DTD), and a communication interface coupled to the parser and configured to receive the binary representation through a medium.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides an extensible binary coding (CMF-B) and related extensible mark-up language (CMF-X) that achieves an efficient dual-representation format and allows for efficient communication of XML-based data through communication media, particularly those with narrow or low bandwidth constraints. The present invention thereby achieves a dual-representation of the same data that can be seamlessly converted back and forth. The CMF-X data format is preferably a fully XML-compliant, ASCII-based, subset implementation of XML that can be used with commercial-off-the-shelf (COTS) tools and is human readable. Due to the tag-based nature of XML and the use of text for all tags and data, CMF-X can be fully extensible and byte-based. The CMF-B data format is preferably an XML-based, compact, binary representation that is efficient for transmission through networks, particularly those where bandwidth and critical timing constraints are encountered, such as in over-the-air (OTA) transmissions. As discussed below, new binary data constructs can be created to provide individual field and package structures that are extensibility equivalent and similar to XML. Further details and embodiments of the present invention are described below. In addition, the APPENDIX included below provides a detailed explanation of the CMF-X and CMF-B data formats.

Figure 1:
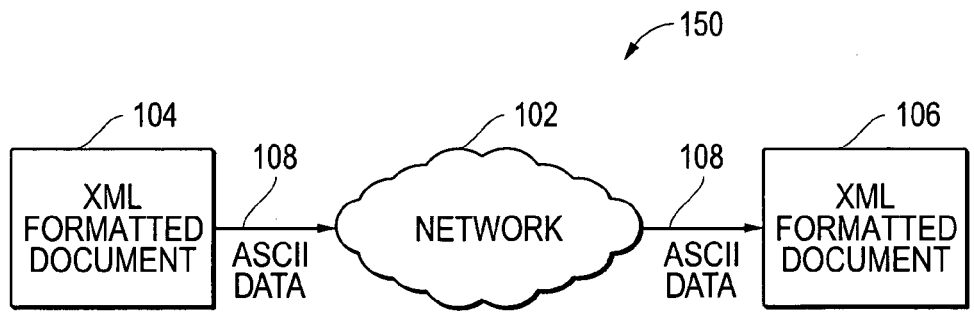
FIG. 1 (prior art) is a block diagram for a prior art system in which XML formatted data is communicated directly through a network as ASCII encoded data.
Figure 2:
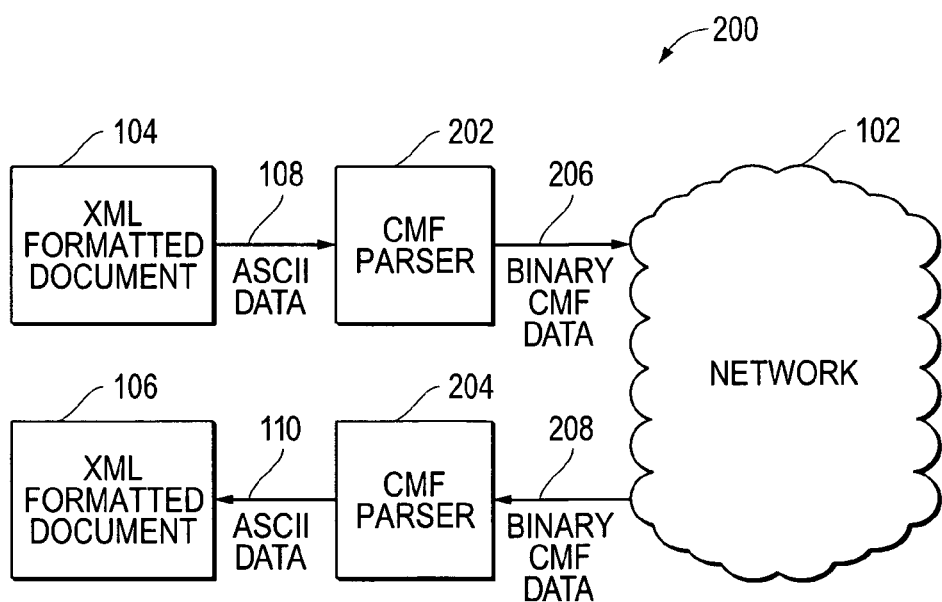
FIG. 2 is a block diagram for an embodiment according to the present invention where CMF parsers are utilized for conversion between XML-based ASCII or Unicode encoded data to binary CMF data for network communications.

FIG. 2 is a block diagram for an embodiment 200 according to the present invention where CMF parsers 202 and 204 are utilized for conversion between XML-based ASCII encoded data to binary CMF data for communications through network 102. In particular, unlike FIG. 1A (prior art) where ASCII data is packaged and transmitted across network 102, CMF parser 202 converts the XML formatted document (CMF-X) from ASCII data into binary CMF (CMF-B) data for transmission through network 102, as represented by line 206. This CMF-B data, which is described in further detail in the APPENDIX attached below, is extensible and preferable infinitely extensible. Once passed through network 102, the CMF-B data is received by CMF parser 204, as represented by line 208. CMF parser 204 THEN converts the CMF-B data back into an XML recognizable ASCII format (CMF-X). As described below, the CMF-B data coding of the present invention allows for reduced bandwidth requirements by reducing the number of bits that are transmitted. It is further noted that the network 102 can be made up of any of a wide variety of communications systems and devices, both wired and wireless, that ultimately provide communication connectivity between two systems. It is also noted that the present invention is particularly useful for narrow or low bandwidth communication channels, such as those that have a bandwidth or data rate of less than 9600 baud. It is further noted that the present invention is not limited to communications systems and may be equally applicable to other hardware or software systems and media such as data storage systems, EPROMs, gate arrays, programmable logic devices (PLDs), video devices, audio devices, graphical devices, flash memory, fiber optics, Digital Video Discs (DVDs), and Compact Discs (CDs), amongst other systems in which data is transferred.

Figure 3A:
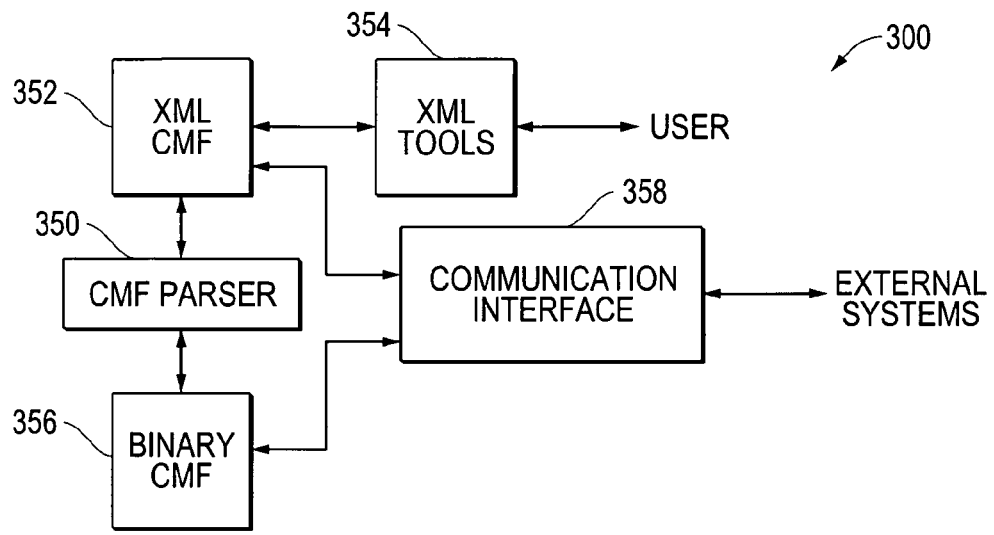
FIG. 3A is a block diagram for a system that includes a CMF parser according to the present invention.

FIG. 3A is a block diagram for a system 300 that includes a CMF parser 350 according to the present invention. Block 352 represents a XML formatted CMF data (CMF-X) that can be manipulated by a user, as desired, using standard XML tools, as represented by block 354. As discussed in more detailed below, the CMF-X format is compatible with standard XML but does not necessarily implement all aspects of the XML standard. The CMF parser 350 allows for seamless conversion from the CMF-X data to extensible binary CMF data (CMF-B) as represented by block 356. The communications interface 358 can then preferably use the CMF-B formatted data from block 356 for transmission to external systems that also have operational CMF parsers. If desired, the system 300 could also transmit CMF-X data from block 352 to external systems, if desired. These less efficient communications may be desirable, for example, where the receiving external system does not have an operational CMF parser or where the bandwidth of the communication channel is large enough to handle the larger bit-rates needed to transfer XML formatted data. Additionally, the CMF parser 350 could also provide an XML-equivalent form of the data via other standard interfaces such as the Document Object Model (DOM).

Figure 3B:
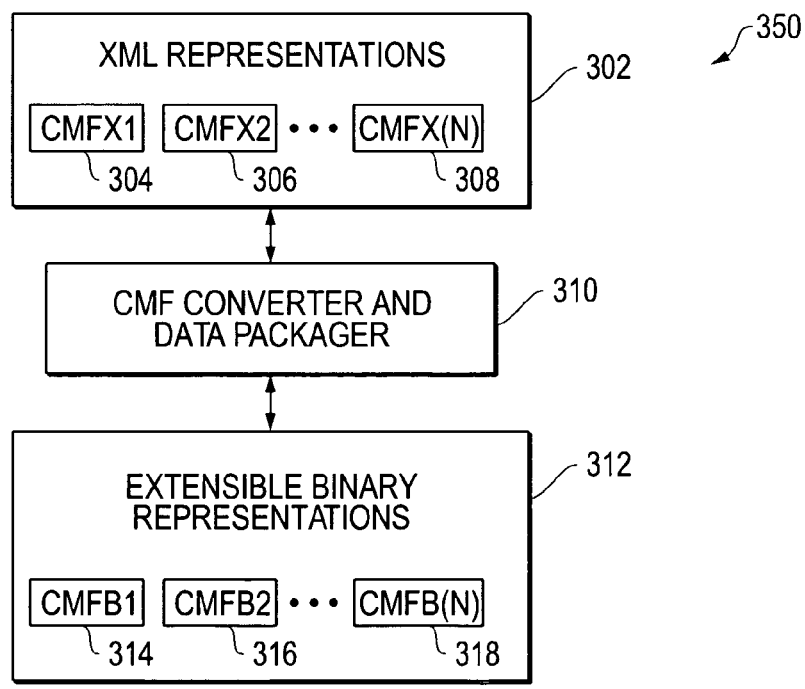
FIG. 3B is a block diagram for a CMF parser according to the present invention.

FIG. 3B is a block diagram for a CMF parser 350 according to the present invention. The CMF parser 350 includes a CMF converter and data packager 310 that converts data between the two formats and creates data packets, as discussed in further detail in the APPENDIX below. XML representations 302 represent the extensible mark-up language protocols and formats supported by the CMF-X data coding scheme. This CMF-X data is preferably compatible with standard XML. Blocks 304, 306 . . . 308 represent individual CMF-X representations CMFX1, CMFX2 . . . CMFX(N). Similarly, extensible binary representations 312 represent the extensible binary protocols and formats that are supported by the CMF-B data coding scheme. This CMF-B data format is preferably constructed so as to make data transmissions more efficient. Blocks 314, 316 . . . 318 represent individual CMF-B representations CMFB1, CMFB2 . . . CMFB(N) that correspond to CMF-X representations. In operation, the CMF parser 350 takes the CMF-X data from block 352 and uses a mapping or conversion scheme within block 310 to convert this CMF-X data to CMF-B data provided to block 356. Going the other way, the CMF parser 305 takes the CMF-B data from block 356 and uses a mapping or conversion scheme within block 310 to convert this CMF-B data to CMF-X data provided to block 352. The XML representations 302 and correlating extensible binary representations 312 are utilized to provide this conversion. The parser 350, therefore, provides seamless dual-representation functionality.

Figure 4:
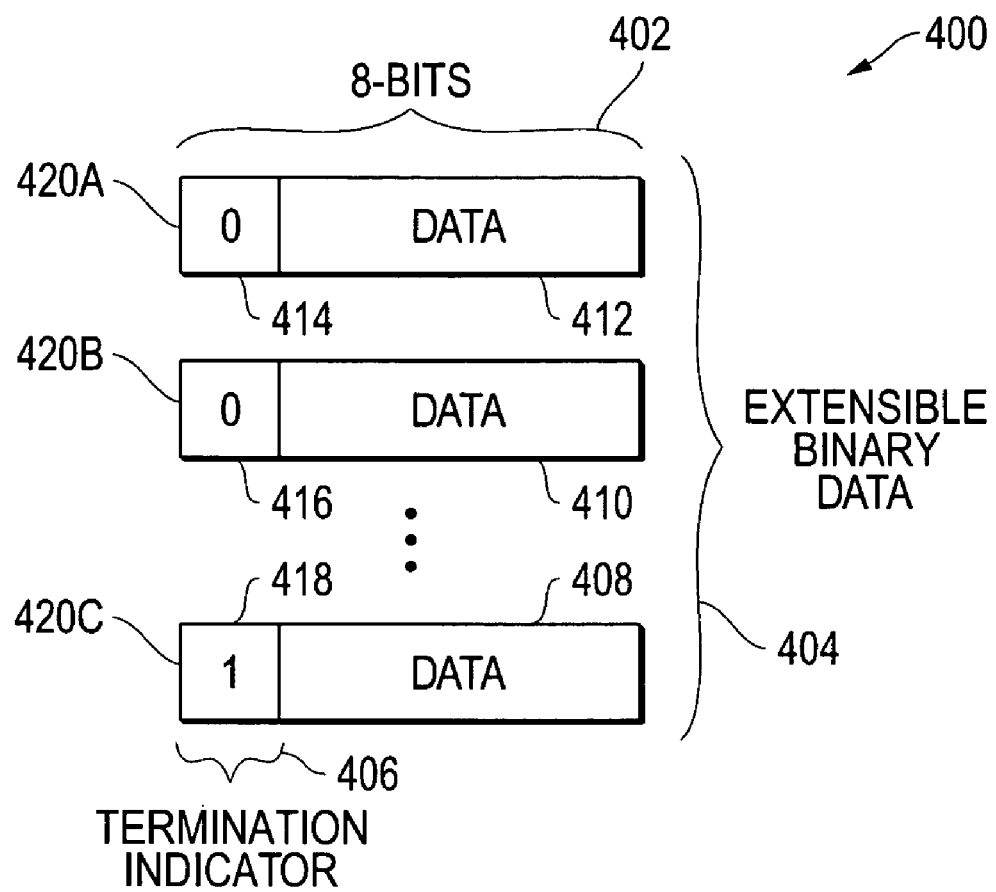
FIG. 4 is a block diagram for an extensible binary data format according to the present invention.

FIG. 4 is a block diagram for an extensible binary data format 400 according to the present invention. Although this data format is described in more detail in the APPENDIX below, the basic idea for an extensible binary data format is presented in FIG. 4. In particular, the binary data 404 is extensible, and preferably infinitely extensible, with the use of termination indicator bits 406. In the embodiment depicted, data bytes 420A, 420B . . . 420C are each 8-bit data bytes, as represented by element 402. More particularly, byte 420A includes a single termination indicator bit 414, as a most-significant-bit (MSB), and seven data bits 412. Similarly, byte 420B includes a single termination indicator bit 416, as its MSB, and seven data bits 410. And byte 420C includes a single termination indicator bit 418, as its MSB, and seven data bits 408. The termination indicator bits 406 for each data byte of the extensible binary data 404 indicates whether or not another byte is needed to complete the data word. When the bit is a "0" as with termination indicators 414 and 416, additional bytes are needed to complete the data word. When the bit is a "1" as with termination indicator 418, the data word ends with this byte. In this way, a non-fixed data word is implemented by the extensible binary coding of the present invention which allows for efficient and advantageous representations of XML-based data for efficient data communications. It is noted that the 8-bit byte embodiment 400 described with respect to FIG. 4 could be modified if desired. More generally, an X-bit base data byte could be used with N-bits (one or more) representing a termination indicator and M-bits representing the data portion of the X-bit data word. Thus, the N-bits plus M-bits make up the base X-bit data byte.

In contrast with the present invention, some prior approaches define a method for utilization of the upper bit of an 8-bit byte as an indicator of either multi-byte continuation or, less commonly, as termination of multiple bytes. Prior approaches do so for unsigned integer values or token extension, but this invention does so as part of a comprehensive and consistent, multi-byte, and preferably infinite extensibility approach across all values of the XML-based binary element structure to include positive (i.e. unsigned) integers; strings; floating point mantissa, exponent, and extension values; enumerated values; binary tags; pattern values; and packed Boolean values. All values and all components of the byte stream of this invention utilize a multi-byte structure identified by use of a termination indicator. Additionally, this invention makes specific use of the special case of all 8 bits being zero which is not otherwise a normal value when utilizing the upper bit of value bytes as a termination indicator.

The present invention further provides a unique approach for declaration of binary data types and tags via a standard XML Document Type Definition (DTD) file which utilizes the XML attribute construct to identify and declare elements; assign numbers to element tag names; and identify an element's type definitions as well as element characteristics such as value ranges, accuracy ranges, defined reportable units, and reporting path specific characteristics. This differs from utilizing tokenization during parse processing of a data stream to identify the components of the equivalent XML structure within the binary equivalent and to identify tags and tag names in that for this invention the attributes within the DTD file identify the structure components.

The CMF specification, which has been attached as an APPENDIX below, further describes the embodiments described above. This CMF specification is subject to the notice of copyright at the beginning of this specification.

APPENDIX

COMMON MESSAGE FORMAT (CMF) SPECIFICATION

1.0 Document Scope

This document describes the Common Message Format (CMF). CMF is a highly extensible formatting capability to be used for the exchange of information. Narrowband networks with extremely limited bandwidth and wideband networks with significant bandwidth are both specifically supported.

CMF uniquely provides a capability to both directly and indirectly utilize the immense flexibility and extensibility of the commercial eXtensible Markup Language (XML)[1] standard without the impact of the normal American Standard Code for Information Interchange (ASCII) or Universal Code (UNICODE) encoding. The ASCII or UNICODE impact is avoided by the invention of both a unique binary value encoding scheme and a binary packaging scheme which parallels the capabilities of the XML standard. The binary capabilities of CMF are mirrored by the additional definition of a corollary CMF defined, but standard, implementation of XML.

This document provides an explanation of the structure, construction, data conventions, implementation guidelines, and maintenance procedures followed to utilize the CMF. This document assumes the reader is familiar with the commercial XML standard including standard notations, structures, and usage for both DTD files and XML documents.

---

[1] Reference 1: *eXtensible Markup Language (XML)*, Specification 1.0 (http://www.w3.org/TR/REC-xml)

1.1 CMF Purpose

The goal of CMF is to provide capabilities to support data information exchange requirements while leveraging the wide availability and flexibility of commercial XML tools, but also while utilizing a data encoding (i.e. representation) which minimizes the use of bandwidth. CMF is designed to be usable across a similar range of data sets (e.g. banking, literature, geology, etc.) as the commercial XML standard.

1.2 CMF Concept

CMF provides fully extensible data types and flexible data structures to meet current and future information exchange requirements. An implementation of the commercial standard eXtensible Markup Language (XML) Document Type Definition (DTD)[2] provides the basic data structure for CMF. By retaining DTD compatibility with the XML standard, commercially available tools can be used to create and maintain a DTD.

A DTD contains the implementation framework for the data elements and their tags, attributes, and structure to be found in a data stream. Generic parsing software, which contains no hardcoded data information, uses a DTD to identify and parse data elements from the data stream. The contents of a CMF DTD are based upon, and compliant with, the data element names, ranges, and definitions required to be exchanged across a network utilizing CMF.

CMF provides two transmission representation (i.e. encoding) types to support the narrowband and wideband mediums, respectively (see Table 1.2-1). CMF-B is a custom, binary derivation of the XML tag-based standard which is uniquely suited for (but not limited to) low bandwidth networks. Special attributes, rules, and parsing software must exist for the CMF-B derivative of XML. CMF-X is a "well formed" and "valid" implementation of the XML commercial standard to be utilized primarily on mid to high bandwidth networks due to its fully character-based implementation. The CMF-X, being a true XML implementation, supports the use of numerous commercially available tools (e.g. web browsers) for CMF-X parsing, databasing, and display. Both representations of a single data set can be defined and parsed using a single (i.e. shared) DTD file.

CMF thus is a single format capability where a single set of data elements and attributes, are supported by two possible ways to represent the data. Since the two representations are 100% compatible, transferring data from one representation to the other does not affect data values, units, ranges, or accuracies. The more efficient CMF-B representation may be utilized for bandwidth restricted mediums with full compatibility after transfer to or from CMF-X which supports the use of standard commercial XML tools.

---

[2] Reference 1: *eXtensible Markup Language (XML)*, Specification 1.0 (http://www.w3.org/TR/REC-xml)

Table 1.2-1 CMF to Network Matrix

| TYPICAL TRANSMISSION MEDIUM | FORMAT TYPE | USES DTD | USES STANDARD XML PARSING |
|---|---|---|---|
| Narrowband Networks | CMF-B | Yes | No |
| Wideband Networks | CMF-X | Yes | Yes |

Note that CMF-B is not limited to only the narrowband, but may also be useful to maximize bandwidth usage on higher bandwidth mediums.

1.3 Document Organization

This document is divided into two major sections. Section 3 describes the CMF data structures and construction rules. Section 4 describes the Document Type Definition (DTD) notation conventions and maintenance rules.

Appendices are provided to aid in understanding of this document. Appendix A provides different views of a hypothetical example DTD. Appendix B contains examples of each of the two CMF representation types (i.e. CMF-B and CMF-X) using the DTD from Appendix A.

2.0 Applicable Documents

The following documents apply to the extent referenced herein.

*eXtensible Markup Language (XML),* Specification 1.0,
Second Edition, World-Wide-Web Consortium (W3C),
(http://www.w3.org/TR/REC-xml)

3.0 Common Message Format (CMF)

The Common Message Format is a data structure that allows flexibility and extensibility in the creation and maintenance of data messages and data fields.

CMF-X conforms to standard XML rules and therefore must be, "well formed". CMF-X is defined by a DTD, and validates against a DTD, and therefore must be "a valid document". By definition the XML standard, and therefore CMF-X, is totally character based and is thus a human readable data representation. CMF-X utilizes XML standard tagging and attribute rules. In addition to standard XML rules, there are some limitations on CMF-X provided herein. Any such limitations are in order to maintain translation coherency with CMF-B.

CMF-B is a binary representation derived from the XML tag-based standard. CMF-B is defined by the same DTD, but only conforms to a subset of the standard XML rules and can not be validated against the DTD using XML standard tools. The CMF-B format is binary and is not readily human readable.

All elements of standard XML are identified by a unique element start tag and a similar end tag. XML elements can also have attributes which further describe the element and/or its content. Basic XML structure includes an element tag before every element. CMF-X follows this construct providing standard character named element tags. CMF-X also provides end tags after the element (and any nested elements) in accordance with standard XML structure.

In contrast, CMF-B provides the start tag for elements but rather than passing it as a string of characters, CMF-B provides the tag as a numeric positive integer value to conserve bandwidth. In CMF-B there are also numerous exceptions to providing a tag for every field. The avoidance of tags is also in order to save bandwidth. CMF-B never provides an end tag because it utilizes self-defining field terminators in combination with group lengths to perform the same function more efficiently.

3.1 CMF Data Representations

CMF data values are passed using six possible data representations: INTEGER, ENUMERATED, FLOAT, STRING, PATTERN, and PACKED COMPONENT. The way data values are represented in CMF-X and CMF-B is summarized in table 3.1-1 and detailed in the following paragraphs.

Table 3.1-1 Data Representation Summary

| DATA TYPE | CMF-X | CMF-B |
|---|---|---|
| INTEGER | Passed as a non-decimal number in the form of numerical ASCII digit characters only (i.e. each digit in range 0-9 and no negative numbers allowed). May also be passed as the character representation of a scientific notation number (i.e. positive mantissa and exponents only and no decimal point). Optionally, a unit attribute may be present and an indicator may be present to indicate less than or greater than the lower or upper range, respectively. Refer to section 3.1.1.1 for details. | Passed as a binary positive integer value (see section 3.1.2.1). |
| ENUMERATED | Passed as a character string representing enumerated string values as defined (see section 3.1.1.2). | Passed as a binary positive integer value representing the number assigned to the selected enumerated string (see section 3.1.2.2). |
| FLOAT | Passed as ASCII character string representation of a float value. The float value is expressed in a scientific notation form with optional unit indicator and accuracy scientific notation value attributes. Float values may also indicate in an attribute that they represent a "less than" or "greater than" value. (see section 3.1.1.3) | Passed as a combination of CMF binary integers and special types of binary integers. The integers indicate the mantissa and exponent of a float value in scientific notation form along with an optional unit indicator and an optional accuracy value in scientific notation format. The value may also be indicated to be a "less than" or "greater than" value. (see section 3.1.2.3) |
| STRING | Passed as a standard XML string of characters (see section 3.1.1.4). | Passed as a series of 7-bit ASCII characters which are self defining for length (see section 3.1.2.4) |
| PATTERN | Passed as the character representation of all components of the pattern (see section 3.1.1.5). | Passed as one or more series of 7-bit ASCII characters which are self defining for length and/or as one or more binary positive integer values (see section 3.1.2.5). |
| PACKED COMPONENT | Passed as the character representation of the current state of a two-state value (e.g. "On", "Off", "Enabled", "Disabled", etc.). (see section 3.1.1.6) | Passed with other PACKED COMPONENTs in one or more PACKED element bytes. PACKED COMPONENTs use two-bits each to indicate one of four possible states. The four possible states are the two value states plus the no-change and reset states (see sections 3.1.2.6 and 3.3.5). |

3.1.1 CMF-X Data Representations

CMF-X data representations have the following characteristics:

- Values are fully extensible
- The length of all values is determined using end tags
- Many values have a "Reset" attribute to indicate a "Reset to No Data or Initial Value" (see sections 3.2.1 and 3.2.2). "Reset to No Data or Initial Value" tells the recipient that any values previously sent for the particular field should be reset to the initial value or to the "No Data" state meaning (i.e. just as though data was never sent for the respective value).

The data representations used by CMF-X are as follows:

- Positive INTEGER
- ENUMERATED
- FLOATing Point /Signed Integer
- STRING
- PATTERN
- PACKED COMPONENT All data representations in CMF-X are passed as character strings.

3.1.1.1 CMF-X Positive INTEGER Data Representation

In CMF-X the Positive INTEGER data representation is passed as numerical ASCII digit characters only (i.e. each digit in range 0-9 and no negative numbers allowed). Alternatively, the number may be represented in the form of "xEy" (see 3.1.1.3 below) where both the mantissa and exponent are always positive. Comma separators are not supported in the input or output values.

An INTEGER element may also indicate something "less than" the defined lower range of the element or something "greater than" the defined upper range of the element by inclusion of a value qualifier attribute in the CMF-X. Additionally, a unit indicator attribute may be defined and present in CMF-X (see Tables 4.1.2-1 and 4.1.2-2).

CMF-X may likewise contain "value offset" or "value multiplier" indicator attributes defined as constant values to which the reported INTEGER value must be added or multiplied by, respectively, to obtain the actual reported value.

3.1.1.2 CMF-X ENUMERATED Data Representation

The ENUMERATED data representation provides a way to pass a value selected from an enumerated (i.e. finite individually numbered), pre-defined list of character strings. In CMF-X, the value for an ENUMERATED data representation is passed using the selected character string exactly as declared and enclosed in its character-based start and end tags.

3.1.1.3 CMF-X FLOATing Point/Signed Integer Data Representation

The basis of the FLOATing Point/Signed Integer data representation is scientific notation as follows: if "x" is the mantissa and "y" is the exponent, then the value is equal to $\pm x * 10^{\pm y}$ which is more commonly expressed as "$\pm xE\pm y$". Note the leading sign may be left off if it is positive. In CMF-X, the FLOATing Point/Signed Integer data representation is passed in scientific notation in the form of:

"(s1m1Es2e1)"

> where s1 is the sign of the mantissa for float value,
> m1 is the mantissa of the float value,
> E is the letter "E" or "e" indicating a power of ten,
> s2 is the sign of the exponent of the value, and
> e1 is the exponent of the value.

An example CMF-X float string is: "-10E-1" indicating a value of minus 1.0. Alternatively, the CMF-X float value may be represented with a decimal point such as 124.75 or even as 1.25E3. The transmitted form is determined by the encoding parser. Both the scientific notation and decimal forms must be accepted by the decoding parser. Comma separators are not supported in the input or output values.

In addition to the value itself, the float representation in CMF-X may have units or accuracy assigned or selectable. The unit value, if declared in the DTD, will be provided in the CMF-X stream as the selected unit character string in a unit attribute of the floating point element using standard XML attribute notation. Likewise, if the accuracy attribute is declared in the DTD and an accuracy value (other than one equal to the implied accuracy of the float's value) is provided by the host (see 3.1.2.3.2), it is provided as an accuracy attribute of the floating point element in the form:

"(s3m2Es4e2)"

> where s3 is the sign of the mantissa for the value's accuracy,
> m2 is the mantissa of the value's accuracy,
> E is the letter "E" or "e" indicating a power of ten,
> s4 is the sign of the exponent for the accuracy, and
> e2 is the exponent of the accuracy.

Note here, the "s3" leading sign may be left off if it is positive or may always be left off since the accuracy is interpreted to always be a plus or minus value. Additionally, an attribute is available for float elements to indicate that the float value provided is a reported value that is actually either a "less than" or "greater than" value (see Table 4.1.2-1). In other words, the true value is known by the data originator to be something less than or greater than the value which was reported.

3.1.1.4 CMF-X STRING Data Representation

In CMF-X, the value for the STRING data representations is passed as a standard XML string of characters (US-ASCII) enclosed in its character-based start and end tags.

3.1.1.5 CMF-X PATTERN Data Representation

The PATTERN representation provides the ability to mix numeric and alphabetic data in a single element to represent fields having predetermined and typically complex patterns. Such mixes of data are possible with the CMF string representation, but the PATTERN representation provides control over the contents of the value and, for CMF-B, additional bandwidth efficiency not otherwise available.

In CMF-X the PATTERN representation is passed as the character representation of all components of the pattern where all components meet the pattern specification.

The pattern is defined in the DTD in the form:

"charcount<fieldIDs>charcount<fieldIDs>..... charcount<fieldIDs>"

> where each "charcount<fieldIDs>" is one component of the pattern,
> "charcount" identifies how many characters are to be provided for the pattern component, and
> "<fieldIDs> defines the pattern for the component using a combination of special field IDs or standard field IDs (see Table 3.1.1.5-1).

The number of "fieldIDs" can be greater than the "charcount" in that any combination of the provided "fieldIDs" is allowed as a value for the component, but the transmitted combination will be no more and no less than "charcount" characters.

The only nesting within a component's "fieldIDs" is provided by the "[" and "]" Special Field ID (see Table 3.1.1.5-1). If a component has one or more of these exclusivity "fieldIDs", then those so marked are exclusive -- meaning only one can provide the representation for any given data instance. The total of the "charcount" values within each of the exclusivity "fieldIDs" must equal the "charcount" for the enclosing component. Also, between each of a component's exclusivity "fieldIDs", both the "charcount" of each nested type representation (i.e. character or integer) and the order of the different representations must be the same. Note the nesting of the representation within an exclusivity "fieldID" follows the same rules as the enclosing PATTERN form given above (see exclusivity "Special Field ID" in Table 3.1.1.5-1).

For CMF-X, all components are sent as a standard XML string of characters. The total number of characters sent is the sum of all the "charcount" values (except those within exclusivity enclosures).

Table 3.1.1.5-1  PATTERN Field IDs

| Special Field IDs | Standard Field IDs |
|---|---|
| N = Numeric digit (integer value 0-9) | ? = Question mark character |
| A = Alphabetic character (A-Z or a-z only) | @ = At sign character |
| D = Digit character (character 0-9) | ~ = Tilde character |
| X = Alphanumeric character (A-Z, a-z, or 0-9) | ! = Exclamation character |
| Y = Any printable 7-bit ASCII character | # = Pound character |
| Z = Any 7-bit ASCII character | $ = Dollar character |
| S = Space character | ^ = Carat character |
| H = Hyphen character | \| = Bar (Unit Separator) character |
| U = Underscore character | { = Left Brace character |
| P = Period character | } = Right Brace character |
| C = Comma character | * = Asterisk character |
| Q = Forward Quote (single quote) character | + = Plus sign character |
| B = Backward Quote (single quote) character | / = Forward slash character |
| M = Marks (double quote) character | \ = Backward slash character |
| E = Equals sign character | : = Colon character |
| L = Left parenthesis character | ; = Semi-colon character |
| R = Right parenthesis character | |
| O = Originate (left) Bracket | |
| T = Terminate (right) Bracket | |
| F = Fewer than character | |
| G = Greater than character | |
| J = Join (Ampersand) character | |
| V = Variance (Percent) character | |

N(m-n) = Allowable range for digits of numeric integer where "m" defines the lower numeric value range and "n" identifies the upper numeric value range. Both range values are always positive. For example (32-74).

A(A-Z)(a-z) = Allowable range of alpha characters where "A" identifies the lowest allowable uppercase alpha character, "Z" identifies the highest allowable uppercase alpha character, "a" identifies the lowest allowable lowercase alpha character, and "z" identifies the highest allowable lowercase alpha character. Note lack of the entire uppercase or lowercase range disallows the characters of uppercase or lowercase, respectively. For example A(M-R) or A(m-r) or A(M-R)(m-r) are legal. The ranges may appear in either order and more than one of each type may occur to obtain discontinuous ranges. For example, A(m-r)(M-R) and A(M-R)(Y-Z) are also legal.

D(m-n) = Allowable range of character digits where "m" defines the lower character digit and "n" identifies the upper character digit. Both digits are always positive. For example (2-7).

X(A-Z)(a-z)(0-9) = Allowable range of alphanumeric characters where "A" identifies the lowest allowable uppercase alpha character, "Z" identifies the highest allowable uppercase alpha character, "a" identifies the lowest allowable lowercase alpha character, "z" identifies the highest allowable lowercase alpha character, "0" identifies the lowest allowable character digit, and "9" identifies the highest allowable character digit. Note lack of the entire uppercase or lowercase range disallows the characters of uppercase or lowercase, respectively. For example X(M-R)(4-7) or X(m-r)(3-7) or X(M-R)(m-r)(3-7) are legal. The ranges may appear in any order and more than one of each type may occur to obtain discontinuous ranges. For example, X(m-r)(M-R)(3-7), X(M-R)(Y-Z)(3-7), and X(3-7)(m-r)(M-R) are also legal.

[charcount<fieldIDs>charcount<fieldIDs>..... charcount<fieldIDs>] = This set of IDs is exclusive with other IDs within the enclosing component.

As a very simple example, the pattern "1A" represents an element whose value can contain a single letter in the uppercase range "A" through "Z" or the lowercase range "a" through "z". Similarly the pattern "2A(m-o) would allow for two characters but both can only be in the lowercase range of "m" through "o". The pattern 1ASH1D1N shows that the first character can be an uppercase or lowercase A-Z, can be a space, or can be a hyphen. The second character must be a single character digit in the range 0-9, and the final character must be an integer in the range 0-9 which for CMF-X will be passed as a character.

For CMF-X, the DTD pattern "1DE2[2N(0-42)][2N(50-50)]" would define a field where:

a) the first component group is character and contains either the character digits 0-9 or the equals sign character
b) the second component group although defined as numeric (i.e. INTEGER) is character because this is the XML representation of CMF and it contains a character value in the range zero to forty-two or contains the value fifty.
c) Both component groups are sent as one single three-character string as the value for the PATTERN element.
d) The number directly preceding the bracketed definitions (i.e. the charcount) provides the total number of characters which must be defined within each of the brackets. Thus in the example above, the exclusive patterns within the brackets each define 2 characters of data.

Example legal field representations would be:

942 or 550 or =00 or =09

Given a DTD pattern of "5[3A(A-G)2N(0-77)][3A(H-M)2N(78-99)]" some of the valid representations would include:

ABC76 or HIM99 or AAA00 or MMM78 (note that HHH22 would be illegal).

Given a DTD pattern of "1D4[3A(a-z)1N(1-5)][3A1N(8-9)]" some of the valid representations would include:

9abc4 or 1FFF8 or 9ZZZ9 or 5ABz9 (note that 1aaB4 would be illegal).

For a DTD pattern of "1X2[1A(a-z)1X(L-M)(1-5)][1A1A]" some of the valid representations would include:

9aL or Rbb or mz5 or 1AA (note that RA5 would be illegal).

3.1.1.6 CMF-X PACKED COMPONENT Data Representation

The PACKED COMPONENT representation provides a way to represent single binary bit valued data (i.e. boolean) such as fields that are on/off, true/false, enabled/disabled, etc. Each PACKED COMPONENT is declared with a character string representing one or both of the "set" and "not set" states.

In CMF-X, each PACKED COMPONENT is treated as a separate element and transmitted as the appropriate character string to represent the current value (i.e. the characters indicating the "set" value or the characters indicating the "not set" value) along with the named character tags for each PACKED COMPONENT (see section 3.3.5). The character representations for each of the two states are provided in the DTD declaration via an attribute.

3.1.2 CMF-B Data Representations

CMF-B data representations have the following characteristics:

- Values are fully extensible
- All values are self defining for field length using a termination bit
- All values having a "Reset" attribute use the instance of all bits in a byte set to zero to indicate a "Reset to No Data or Initial Value" (see sections 3.2.1 and 3.2.2). "Reset to No Data or Initial Value" tells the recipient that any values previously sent for the particular field should be reset to the initial value or to the "No Data" state meaning (i.e. just as though data was never sent for the respective field).

The data representations used by CMF-B are as follows:

- Positive INTEGER
- ENUMERATED
- FLOATing Point /Signed Integer
- STRING
- PATTERN
- PACKED COMPONENT All data representations are byte oriented meaning all bits of each byte belong to one and only one data value (with the exception of the PACKED element type). The documentation for the medium must be consulted to verify transmission bit order, but all discussion herein is based upon a big-endian orientation. All data representations use the seven least significant bits, bits 0 – 6, of each byte to represent data. Bit 7, the most significant bit (MSB) and leftmost in the big-endian orientation, is used as a termination flag. As long as bit seven of a byte is zero (with the exception of the reset value where all bits of the byte are zero), the field extends/continues to the next byte. Bits 0-6 in any extension bytes become the new least significant bits and the 0-6 bits from all bytes are concatenated together to form the full value for the field. When bit seven of a byte is set to one, that byte is the last byte of the field and the following byte is part of the next element or value (exceptions are the FLOAT and PATTERN elements which require multiple values each in this byte extension manner to provide the complete element).

3.1.2.1 CMF-B Positive INTEGER Data Representation

For CMF-B, the Positive INTEGER data representation uses the least significant seven bits, 0-6, of each byte as data (bit 7 is the termination bit). The first byte represents the most significant 7 bits of the integer, with each successive byte representing lesser significant 7 bits, until the last byte, which represents the least significant 7 bits of the integer. Leading zeros can be placed on the original values, but they are not preserved through CMF-B transmission. Comma separators are not supported in the input or output values.

CMF-B Example: The integer "255", (FFh) uses two bytes as follows in hexadecimal: "01-FF" or in binary (dash only for clarity): "0-0000001  1-1111111". Note the termination bit set in the last byte.

CMF-B Example 2: The integer value "11,212,230", (AB15C6h) uses four bytes in CMF-B as follows in hexadecimal: "05-2C-2B-C6" or in binary 0-0000101  0-0101100  0-0101011  1-1000110. Note the termination bit set in the last byte.

3.1.2.1.1 CMF-B Positive INTEGER Less Than and Greater Than Indication

If a value qualifier attribute is defined for an INTEGER element (see Tables 4.1.2-1 and 4.1.2-2), in CMF-B the element may also indicate something "less than" the defined lower range of the element or something "greater than" the defined upper range of the element by the actual transmission of a value one less than the lower range or one greater than the upper range, respectively.

3.1.2.2 CMF-B ENUMERATED Data Representation

The ENUMERATED data representation provides a way to pass a value selected from an enumerated (i.e. finite individually numbered), pre-defined list of character strings. For enumerated data, both a character enumeration string and an equivalent integer number are declared in the DTD for each allowable value. In CMF-B only the equivalent integer values are passed.

CMF-B Example: The enumeration string "Japan" assigned an equivalent integer of "57", (39h) uses one byte as follows in hexadecimal: "B9" or in binary 1-0111001. Note the termination bit set in the byte.

3.1.2.3 CMF-B FLOATing Point/Signed Integer Data Representation

The basis of the FLOATing Point/Signed Integer data representation is scientific notation as follows: if "x" is the mantissa and "y" is the exponent, then the value is equal to $\pm x * 10^{\pm y}$. The mantissa part x is represented by a positive integer (see section 3.1.2.1) and is followed by one or more extension bytes. Leading zeros can be placed on the original values, but they are not preserved through CMF-B transmission. Comma separators are not supported in the input or output values.

The mantissa bit pattern (same as a positive integer) is:
    Tbbbbbbb
        where T is byte terminator bit (if T=0, more mantissa bytes follow)
        and
        b is bits of the mantissa value The first extension byte has the normal CMF-B terminator bit in the MSB (i.e. bit 7), the sign bit for the mantissa in bit 6 (0 = positive, and 1 = negative), the sign bit for the exponent in bit 5 (0 = positive, and 1 = negative), and 5-bits of exponent in bits 0-4. If additional exponent range is required, or units other than the default are defined and are being provided, an accuracy other than the default is defined and is being provided, and/or the value is to indicate a "less than" or "greater than" value, then at least one additional extension byte follows the first extension byte.

1st Extension bit pattern is:
    Ts1s2eeeee
        where T is byte terminator bit (if T=0, 2nd Extension byte follows),
        s1 is sign of mantissa
        s2 is sign of exponent, and
        e is bits of the exponent value The second extension byte has the normal CMF-B terminator in the MSB (i.e. bit 7), a bit indicating whether selectable units is being provided in bit 6 (bit=1 indicates "present", 0 or lack of this byte represents "not present"), a bit indicating whether a selectable accuracy value is being sent in bit 5 (bit=1 indicates "present", 0 or lack of this byte represents "not present"), and an additional 5-bits of exponent in bits 0-4. If this is the final byte of the exponent extension (MSB=1), then the additional 5-bits of exponent contain the LSB bits of the exponent and are used in combination with the 5-bits in the first extension byte. Otherwise the exponent LSB bits are in a later extension byte and this byte has 5-bits of middle significance.

2nd Extension bit pattern is:
    Tuaeeeee
        where T is byte terminator bit (if T=0, 3rd Extension byte follows),
        u is selectable units indicator
        a is selectable accuracy indicator, and
        e is additional bits of the exponent value If the second extension byte is present and presence of selectable units is indicated by the selectable units indicator bit (bit 6=1), then the final extension byte will be followed by a positive integer containing the equivalent integer (see section 3.1.2.1) for the units enumeration declared in the DTD.

Likewise if the second extension byte is present and the presence of selectable accuracy is indicated by the selectable accuracy bit (bit 5=1), then the final extension byte (or final selectable unit byte, if present) will be followed by a positive integer containing the mantissa of the selectable accuracy. The final byte of any selectable accuracy mantissa integer is followed by another extension byte of the first type and if necessary, extension bytes of the fourth type to provide the selectable accuracy signs and exponent.

The third extension byte has the normal CMF-B terminator in the MSB (i.e. bit 7), a bit indicating whether the reported float value represents a true value which is actually something less in bit 6 (bit=1 indicates "less than", 0 here and in bit 5 or lack of this byte represents "actual float value reported"), a bit indicating whether the reported float value represents a true value which is actually something greater in bit 5 (bit=1 indicates "greater than", 0 here and in bit 6 or lack of this byte represents "actual float value reported"), and an additional 5-bits of exponent in bits 0-4. If this is the final byte of the exponent extension (MSB=1), then the additional 5-bits of exponent contain the LSB bits of the exponent and are used in combination with the 5-bits in the first and second extension bytes. Otherwise the exponent LSB bits are in a later extension byte and this byte has 5-bits of middle significance.

3rd Extension bit pattern is:
    Tlgeeeee
        where T is byte terminator bit (if T=0, 4th Extension byte follows),
            l is a "less than" indicator
            g is a "greater than" indicator, and
            e is additional bits of the exponent value Note that the "less than" (l) and "greater than" (g) bits in bits 6 and 5, respectively are mutually exclusive meaning they cannot both be set at the same time in the third extension byte.

If a fourth or greater extension byte is required for either the float value exponent or selectable accuracy exponent, bits 5 and 6 are undefined in those bytes, and must be set to zero.

4th Extension bit pattern is:
    T00eeeee
        where T is byte terminator bit (if T=0 more of this byte follow),
            00 is two undefined bits - both set equal to zero, and
            e is bits of the exponent value

3.1.2.3.1 Units

Each element may or may not have a defined default unit assigned in the DTD via one of the default unit keyword attributes (see Table 4.1.2-1). If assigned, the data producer may pass the data value without sending a unit indicator if the value is to be represented in the default units.

Some floating point elements also may or may not have an available unit selector attribute. If the selector is provided in the DTD and a producer wishes to send data in units other than the assigned default, then the producer sets the selectable unit indicator and provides a unit's positive integer value immediately following the final extension byte (as detailed in section 3.1.2.3).

3.1.2.3.2 Accuracy

If a default accuracy is not defined, floating point types can inherently indicate their measured accuracy in the mantissa given the producer provides the data in the same base unit as their accuracy and their accuracy is an exact power of ten (i.e. 100, 10, 1, 0.1, 0.01, 0.001, etc.). For example, data measured as 25.67 Hz plus or minus 0.001 Hz can be indicated by the host providing the data value to CMF as 25.670 which would be represented in the CMF-B floating point form as "25670E-3".

For many floating point elements, an accuracy selector is provided to indicate the correct producer's accuracy when the units are not the same or the producer's accuracy is not an exact power of ten (i.e. 25, 0.003, 3.9, etc.). If the accuracy selector is provided in the DTD, and a producer needs to indicate an accuracy other than the assigned default, then the producer sets the selectable accuracy indicator and provides an accuracy value (as detailed in section 3.1.2.3) immediately following the units byte or if the units is not present, immediately following the final extension byte.

CMF-B Example 1: Value "12.7" (127*10-1) with units (value 1=Hertz) and accuracy of tenths (1*10-1) uses six bytes as follows in binary (dashes only for clarity): "1-1111111 0-0-1-00000 1-1-1-00001 1-0000001 1-0000001 1-0-1-00001". Note the termination bits set in both bytes.
NOTE: The first byte is the value's mantissa. The second is an extension byte of type one including the value's signs and first portion of the exponent (MSB bits of all zeros). The third byte is an extension byte of type two including the units/accuracy indicators and the LSB bits of the value's exponent. The fourth byte is units indicator (1=Hz). The fifth byte is the mantissa of the accuracy and the sixth byte is a type one extension byte containing the accuracy signs and exponent.

CMF-B Example 2: Negative signed integer "-47", (D1h) uses two bytes as follows in hexadecimal: "AF-C0". Note the termination bits set in both bytes.

CMF-B Example 3: Value "12.7" (127*10-1) uses two bytes as follows in hexadecimal: "FF-A1" or in binary (dashes only for clarity): "1-1111111 1-0-1-00001". Note the termination bits set in both bytes.

CMF-B Example 4: Value 127,000,000,000,000,000,000,000,000,000,000,000,000 (127*10$^{36}$) uses three bytes as follows in hexadecimal: "FF-01-84" (ignoring inherent accuracy). Note the termination bits set in the first and last bytes.

CMF-B Example 5: Value 0.000000000000000000000000000000000127 (127*10$^{-36}$) uses three bytes as follows in hexadecimal: "FF-21-84". Note the termination bits set in the first and last bytes.

CMF-B Example 6: Value "127.95" (12795*10$^{-2}$) uses three bytes as follows in hexadecimal: "63-FB-A2". Note the termination bits set in the second and last bytes.

CMF-B Example 7: Value "-127.95" (-12795*10$^{-2}$) uses three bytes as follows in hexadecimal: "63-FB-E2". Note the termination bits set in the second and last bytes.

CMF-B Example 8: Value "-127.95" (-12795*10$^{-2}$) with non-default unit value of 3 uses five bytes as follows in hexadecimal: "63-FB-60-C2-83" or in binary:
"0-1100011 1-1111011 0-1-1-00000 1-1-0-00010 1-0000011".
Note the termination bits set in the second, fourth, and last bytes. First and second bytes contain mantissa value of 12795. Third byte contains negative signs for mantissa and exponent. Fourth byte contains unit present indicator and exponent value of 2. Final byte contains unit value of 3.

CMF-B Example 9: Value "127.95" (12795*10$^{-2}$) with non-default unit value of 4 and non-default accuracy of ±0.05 uses seven bytes as follows in hexadecimal: "63-FB-20-E2-84-85-A2" or in binary:
"0-1100011 1-1111011 0-0-1-00000 1-1-1-00010 1-0000100 1-0000101 1-0-1-00010".
Note the termination bits set in the second and fourth through last bytes. First and second bytes contain element mantissa value of 12795. Third byte contains negative sign for element exponent. Fourth byte contains unit present and accuracy present indicators and exponent value of 2. Fifth byte contains unit value of 4. Sixth byte contains accuracy mantissa of 5 and seventh contains negative sign for accuracy exponent and accuracy exponent value of 2.

CMF-B Example 10: Value indicating ">127.95" (>12795*10$^{-2}$) with non-default unit value of 4 uses six bytes as follows in hexadecimal: "63-FB-20-40-A2-84" or in binary:
"0-1100011 1-1111011 0-0-1-00000 0-1-0-00000 1-0-1-00010 1-0000100".
Note the termination bits set in the second, fourth, and last bytes. First and second bytes contain mantissa value of 12795. Third byte contains negative sign for exponent. Fourth byte contains unit present indicator. Fifth byte contains "greater than" indicator and exponent value of 2. Final byte contains unit value of 4.

3.1.2.4 CMF-B STRING Data Representation

In CMF-B, the STRING data representation uses the 7-bit American Standard Code for Information Interchange (ASCII) values 0-127 (0h-7Fh). See Table 3.1.2.4-1 for character encoding. The STRING type does not use the ASCII extended codes, values 127 – 255 (80h-FFh) because in CMF-B the MSB (i.e. bit 7 or 8th bit) is reserved for the termination indicator bit. The 7-bit ASCII code uses bits 0 – 6 of each byte to represent a character from the ASCII character set.

As is the case for all CMF-B data representations, bit 7, the most significant bit, is used as a termination flag. With the exception of the reset case, as long as bit seven of a byte in a string field is clear (0), the string field extends to the next byte (i.e. there is another character as part of the representation). When bit seven is set (1), the character in that byte is the last character of the field value and any following byte is part of the next element or value. Table 3.1.2.4-2 shows ASCII codes with the termination bit set.

Table 3.1.2.4-1 ASCII Table (Termination Bit Clear)

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | RST | SOH | STX | ETX | EOT | ENQ | ACK | BEL | BS | HT | LF | VT | FF | CR | SO | SI |
| 1 | DLE | DC1 | DC2 | DC3 | DC4 | NAK | SYN | ETB | CAN | EM | SUB | ESC | FS | GS | RS | US |
| 2 | SP | ! | " | # | $ | % | & | ' | ( | ) | * | + | , | - | . | / |
| 3 | 0 | 1 | 2 | 3 | 4 | 5 | 6 | 7 | 8 | 9 | : | ; | < | = | > | ? |
| 4 | @ | A | B | C | D | E | F | G | H | I | J | K | L | M | N | O |
| 5 | P | Q | R | S | T | U | V | W | X | W | Z | [ | \ | ] | ^ | _ |
| 6 | ` | a | b | c | d | e | f | g | h | i | j | k | l | m | n | o |
| 7 | p | q | r | s | t | u | v | w | x | y | z | { | | | } | ~ | DEL |

Table 3.1.2.4-2 ASCII Table (Termination Bit Set)

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 8 | NUL | SOH | STX | ETX | EOT | ENQ | ACK | BEL | BS | HT | LF | VT | FF | CR | SO | SI |
| 9 | DLE | DC1 | DC2 | DC3 | DC4 | NAK | SYN | ETB | CAN | EM | SUB | ESC | FS | GS | RS | US |
| A | SP | ! | " | # | $ | % | & | ' | ( | ) | * | + | , | - | . | / |
| B | 0 | 1 | 2 | 3 | 4 | 5 | 6 | 7 | 8 | 9 | : | ; | < | = | > | ? |
| C | @ | A | B | C | D | E | F | G | H | I | J | K | L | M | N | O |
| D | P | Q | R | S | T | U | V | W | X | W | Z | [ | \ | ] | ^ | _ |
| E | ` | a | b | c | d | e | f | g | h | i | j | k | l | m | n | o |
| F | p | q | r | s | t | u | v | w | x | y | z | { | \| | } | ~ | DEL |

CMF-B Example 1: The one word element value, "HAT", contains three bytes as follows in binary (the dash is only for clarity): "0-1001000 0-1000001 1-1010100". Note the termination bit set in the last byte.

CMF-B Example 2: The one word element value, "TEST", contains four bytes as follows in hexadecimal: "54-45-53-D4". Note the termination bit set in the last byte.

CMF-B Example 3: The multiple word element value, "This is a test", contains 14 bytes as follows in hexadecimal: "54-68-69-73-20-69-73-20-61-20-74-65-73-F4". Note the termination bit set in the last byte.

3.1.2.5 CMF-B PATTERN Data Representation

The PATTERN representation provides the ability to mix numeric and alphabetic data in a single element to represent values having predetermined and typically complex patterns. Such mixes of data are possible with the CMF string representation, but the PATTERN representation provides control over the contents of the value and, for CMF-B, additional bandwidth efficiency not otherwise available.

In CMF-B the PATTERN representation is passed as one or more series of 7-bit ASCII characters which are self defining for length and/or as one or more binary positive integer values. The determination of how many characters versus how many positive integers and in what order is determined from the pattern representation (see section 3.1.1.5 for pattern specification details).

For CMF-B, all components using one of the character type representations (i.e. actually all except the "N" and "N(m-n) fieldID types) are sent as a string of characters using the basic CMF STRING data representation. The length of each of these components is equal to the "charcount" value for the component. All components having a "fieldtype" of "N" (and the field limited "N(m-n)") are sent as integer values using the basic CMF positive INTEGER data representation.

For CMF-B, the pattern "1DE2[2N(0-42)][2N(50-50)]" would define a field where:

a) the first component group is character and contains either the character digits 0-9 or the equals sign character, (component sent in CMF-B as one character byte)
b) the second component group is INTEGER and contains a value in the range zero to forty-two or contains the value fifty. (component sent in CMF-B as one INTEGER byte).

Example legal field representations would be: 942 or 550 or =0 or =9
For 942 the CMF-B representation would contain two bytes as follows in hexidecimal: "B9-AA" or in binary: "1-0111001 1-0101010". Note the termination bit set in both bytes.

3.1.2.6 CMF-B PACKED COMPONENT Data Representation
The PACKED COMPONENT representation provides a way to represent single binary bit valued (i.e. Boolean) data such as fields that are on/off, true/false, enabled/disabled, etc. Each PACKED COMPONENT is declared with a character string representing each of the "set" and "not set" states.

For CMF-B, PACKED COMPONENTs use two-bits each to indicate one of four possible states. The first PACKED COMPONENT uses bits 4-5, second uses 2-3, and third uses 0-1. The four possible states are the two value (i.e. Boolean) definable states with bit settings of 01 and 10 (i.e. values 1 and 2) plus the reset and no-change states which are reserved for the bit settings of 00 and 11 (i.e. values 0 and 3), respectively (see section 3.3.5 for explanation of the entire byte structure). Note that the reserved bit setting for the reset condition is not a legal value unless the reset attribute is declared for the specific PACKED COMPONENT element.

In CMF-B, the PACKED COMPONENT data representation is sent within a PACKED element. In the PACKED element up to 3 PACKED COMPONENTs are represented in each byte of a packed data field using bits 0-5. As in other CMF-B data representations, the MSB bit 7 is used as a terminator byte. As long as bit seven of a byte in a PACKED element is clear (i.e. zero), the PACKED element extends to the next byte (i.e. there are up to 3 more two-bit data values as part of the representation for each additional byte). When bit seven is set to one, any following byte is part of the next element or value (see section 3.3.5).

3.2 CMF Constructs 3.2.1 CMF Value Initialization and Modification

Prior to any data being received for CMF, all element values are to be assumed as though the producer has "No Data" (i.e. no content) for the element unless there is an "Initial Value" attribute defined for the element, in which case the receiving host is to assume the value of the "Initial Value".

Receptions of data which don't have a value for an element are to be assumed to mean "No Change" for that element value. In other words, retain the last data sent which could either be a value which was previously sent or the "No Data" or "Initial Value" for data which was never sent (or which has been reset previously...see 3.2.2). Note that in a CMF-B Packed Component both bits of the value being set (bits=11) is reserved for indicating a "No Change" state (see section 3.3.5).

CMF additionally permits the declaration of "Default Value" attributes (also definable by path) that provide the most common value which, when provided by the producer for required elements, is not actually transmitted. The removals of the most common value on transmit and subsequent re-insertion on receipt results in a space savings to broadcasts. These values are to be <u>handled only by parser software</u> and the removal and insertion is transparent to application software. The values are passed to the application software as though they were actually transmitted. The removal and insertion operation only occurs when the values are for required elements in their parent content model, the parent element is being sent, and the value provided by the producer matches the defined default. In addition, the removal of default values only occurs for data encoded for transmittal on a defined path and does not occur for direct children elements of COMPOSITE or REPETITIVE elements.

Optional elements that are defined to allow values ARE NOT REPORTED if the producer has no value to report. For CMF, the absence of an element value in the data stream means the originator had data matching the defined default for a required element, had no data, had no new data, or did not wish to provide data for the element. All but the first are referred to as a "No Change" condition. If the originator never sends an element value, the element value will remain in either the Initial Value state, if one is defined, or in the No Data state. In contrast to various other formats, for CMF there is no actual value for the No Data state (with the exception of the PACKED data type, see section 3.3.5).

Once an originator has provided a value for an element, that data is to be retained by receiving systems as the value for the element unless a new value for the element is received or the originator indicates that the element value is to be reset to the No Data or Initial Value state (see 3.2.2). Therefore, once a value for an element is received, the receipt of additional data packages which do not contain the element indicates that no change is to be made to the previous value and when data is received for an element, that data replaces the previously received data.

Data for which the content model requires elements to always be sent together, or for which there are individually repeatable elements, will normally also be replaced on the receipt of new data for the group or new repeatable elements. This is the process for all values unless a separate implementation rule is provided to do otherwise.

3.2.2 CMF Reset

When the originator has previously provided data for an element value and desires to return the element value to the No Data or Initial Value state, CMF provides a special reset indication. For both representations of CMF, an element's value can be reset if it has the reset attribute in its definition, but due to differences in the two representations, there are different ways to indicate a reset condition for CMF-X and CMF-B.

Receipt of a reset indication for an element shall indicate to a receiver that the value for the specified element is to revert to the "No Data" condition unless there is an "Initial Value" attribute defined for the element, in which case the host is to revert to the value of the "Initial Value".

The reset indicator for CMF-X is provided by reporting the reset attribute set to its positive or set (i.e. "Y" for yes) state. For CMF-B, resetting an element value is accomplished by sending only one byte for the element value with all bits set to zero including the termination bit. Since zeros in all eight bits is not a normal value for the first byte of any of the defined CMF-B data representations, the all-zero setting provides a unique value to indicate the reset condition. This unique byte is also called the "reset" byte. For all representations only one byte of the value is sent containing the reset. The other value bytes of the element, regardless of the defined data representation, are not sent. Likewise, some non-FIELD element types may also utilize the reset capability to indicate a reset of all children in their content model (see the element section 3.3) and the PACKED element type has some special reset capability for the associated PACKED COMPONENTs (see section 3.3.5).

It is imperative that each element value is checked for the reset indicator before attempting any calculation or conversion of the value or any sub-component values.

3.2.3 CMF Case Sensitivity

CMF (both CMF-B and CMF-X) maintains case during transmission and is case-sensitive during any value checking or value comparison operations. Of course, CMF utilizes the same case-sensitivity as XML for element names, XML operators, and XML reserved words.

3.2.4 CMF-X and DTD Whitespace Handling

Whitespace, as defined by the XML standard, is not permitted within element names, element values, XML operators, and XML reserved words. For the DTD, whitespace is normally insignificant. Consequently, non-printable characters are to be ignored in a DTD. For CMF-X, whitespace is not significant during the parsing operation and node identification. It is significant for data verification checking to the extent it can compose part of valid values.

For most element attribute DTD declarations having values separated by " | " bars, values which consist of total whitespace between the bars are ignored. Thus a bar at the end of a line and another at beginning of the next line provides the method for performing a line continuation within a declaration. This provides the capability for long attribute declarations in the DTD while maintaining reasonable readability within DTD text edit tools.

3.3 CMF Elements

CMF is an XML-based hierarchy of nested elements. The root element is by definition always the first element in the data stream. All other elements are contained, or nested, within the root element. Each element in standard XML can contain data content or have other elements nested within it or both. This hierarchical nesting results in a tree structure of elements.

For CMF, the standard XML element constructs are utilized to provide five types of packaging elements; FIELD elements, GROUP elements, COMPOSITE elements, REPETITIVE elements, and PACKED elements. Consistent with XML, each of the five types of elements, defined for both CMF-X and CMF-B, may have certain XML attributes. For CMF these attributes are based upon keywords (see Table 4.1.2-1) which are used by a generic CMF parser to efficiently encode, decode, validate, and verify the data elements. The keyword attributes may also be used, if desired, by specialized CMF-X application software to validate, verify, operate on, and/or display the elements.

Data is passed and element type attributes are assigned using the five element types in combination with the six previously detailed data representations: INTEGER, ENUMERATED, FLOAT, STRING, PATTERN, and PACKED COMPONENT. The details of the data representations are provided in section 3.1. The data representations are each identified as one of six possible "field types" within a specific element type.

As in standard XML, each element has a "content model" in the DTD which identifies its allowable contents. Content can be either data or other nested "child" elements. Elements which contain data as content have "PCDATA" (standard XML terminology for data) in their content model and will have a "field type" attribute which identifies the data representation of the data value. Note that CMF does NOT support a "mixed content model" which mixes both data and children elements within the content model of an element. Consistent with XML, elements which contain nested children elements list the names of other declared CMF elements in their declared DTD content model. Table 3.3-1 shows the five types of CMF elements along with their specific function, associated field types, and allowable children element types.

Table 3.3-1 Element Type Utilization

| ELEMENT TYPE | ELEMENT FUNCTION | FIELD TYPE | PERMITTED CHILDREN ELEMENT TYPES |
|---|---|---|---|
| FIELD | Provides data value | INTEGER, ENUMERATED, FLOAT, STRING, PATTERN, PACKED COMPONENT | None (PCDATA only) |
| GROUP | Groups other elements, some of which are not always sent | N/A | GROUP, COMPOSITE, REPETITIVE, PACKED, FIELD (except PACKED COMPONENT) |
| COMPOSITE | Groups other elements which are always sent together | N/A | GROUP, COMPOSITE, REPETITIVE, PACKED, FIELD (except PACKED COMPONENT) |
| REPETITIVE | Groups other elements which are always sent together and repeats them | N/A | GROUP, COMPOSITE, REPETITIVE, PACKED, FIELD (except PACKED COMPONENT) |
| PACKED | Groups two-state PACKED COMPONENT elements | N/A | FIELD (PACKED COMPONENT only) |

3.3.1 Field Elements

The function of Field elements in CMF is to provide actual data content or values. Like other CMF elements, each Field element can have a number of attributes. Attributes for CMF elements use pre-defined keywords as the attribute names (see Tables 4.1.2-1 and 4.1.2-2). These attributes may be "REQUIRED" XML attributes meaning they must be sent in the order defined and prior to the element value. Most attributes are "FIXED" XML attributes and therefore are not sent in the data. (The numeric element tag is the exception in that it is ALWAYS sent in CMF-B in place of the XML character-based tags unless the type of element's parent eliminates the tags.) These keywords provide the ability to define, encode, and decode the more bandwidth-efficient binary CMF by providing information about the data elements to the generic CMF-B parser software. If desired, these keywords can also be used by specialized CMF-X applications since both "REQUIRED" and "FIXED" XML attributes are made available to the application level by commercial parsers. Other applicable attribute types are discussed in section 4.1.2.

Each Field element DTD declaration contains the following:
- Attributes
    a) Element tag (not required if only a sub-component of a REPETITIVE, COMPOSITE, or PACKED_COMPONENT)
    b) Element type set equal to "FIELD"
    c) Field type set equal to "INTEGER", " ENUMERATED", "FLOAT", "STRING", "PATTERN", or "PACKED_COMPONENT"
    d) Various other optional or element type dependent attributes to identify element value defaults, range (min and/or max), unit selections, accuracy selections, lists of allowed values, etc.

The Field DTD element declaration takes the form:

```
<!ELEMENT Field_Name (#PCDATA)>
<!ATTLIST Field_Name keyword_name keyword_declaration>
``` where the attribute list (i.e. ATTLIST) is repeated for each keyword applied to the Field element (or at least the contents are repeated -- both are acceptable XML forms).

An example DTD declaration for a Field element named "Aircraft_Count" would be:

```
<!ELEMENT Aircraft_Count (#PCDATA)>
<!ATTLIST Aircraft_Count reset          (Y | N) "N">
<!ATTLIST Aircraft_Count element_tag    CDATA #FIXED "1">
<!ATTLIST Aircraft_Count element_type   CDATA #FIXED "FIELD">
<!ATTLIST Aircraft_Count field_type     CDATA #FIXED "INTEGER">
<!ATTLIST Aircraft_Count lower_range    CDATA #FIXED "0">
<!ATTLIST Aircraft_Count upper_range    CDATA #FIXED "100">
```

The Field formats for the two types of CMF representations take the following forms:

CMF-X stream format: "<element_name_tag>element_value</element_name_tag>"
CMF-B stream format: "element_binary_tag element_value"

An example of a Field element in the two types of CMF representations would be:

CMF-X stream format: "<Aircraft_Count>12</Aircraft_Count>"
CMF-B stream format (in binary): "10000001 10001100"   Comment: This is the tag and value=12.

A reset for the Field element in the two types of CMF representations takes the forms:

CMF-X reset format: "<element_name_tag *reset="Y"*> </element_name_tag>"
CMF-B reset format: "element_binary_tag special_reset_value"

3.3.2 Group Elements

Group elements in CMF identify organizational nestings (i.e. groupings) of other elements. For CMF, elements can be identified as group elements by the presence of an element_type attribute set equal to "GROUP" (see Table 4.1.2-1). A length value is sent with Group elements in CMF-B to indicate the end of the group in lieu of the end tag used in CMF-X. The length value is calculated as the total number of bytes in the group after the length value. It is inserted as a CMF-B INTEGER value just after the Group tag. For Group elements, the use of the "GROUP" indication combined with the end tag for CMF-X or length value for CMF-B allows the receiving software to 1) verify receipt of grouping content, 2) identify the location of the end of data or the start of the next group, and 3) if new unrecognized elements are in the group, skip to the end of the group without requiring detailed processing of the unknown group components.

For CMF, the root element acts as the start of document indicator and is by definition the largest group element in that ALL other CMF elements are nested within the data document. Additional uses of group elements in CMF include providing associations of elements in order to group related or similar types of data (e.g. all location-related fields).

Each Group element DTD declaration contains the following:
- Attributes
    a) Element tag (not required if only a sub-component of a REPETITIVE or COMPOSITE)
    b) Element_Type attribute set equal to "GROUP"
- One or more other elements declared as sub-elements in the element's content model The Group DTD element declaration takes the form:

```
<!ELEMENT Group_Element_Name (content_model_entries)>
<!ATTLIST Group_Element_Name keyword_name keyword_declaration>
``` where the attribute list (i.e. ATTLIST) is repeated for each keyword applied to the Group element (or at least the contents are repeated -- both are acceptable XML forms).

An example DTD declaration for a Group element named "Cockpit_Readings" would be:

```
<!ELEMENT Cockpit_Readings (Fuel_Reading, Airspeed_Reading*)>
<!ATTLIST Cockpit_Readings reset            (Y | N) "N">
<!ATTLIST Cockpit_Readings element_tag      CDATA #FIXED "1">
<!ATTLIST Cockpit_Readings element_type     CDATA #FIXED "GROUP">
```

The Group formats for the two types of CMF representations take the following forms:

CMF-X stream format:  "<element_name_tag>nested_elements</element_name_tag>"
CMF-B stream format:  "element_binary_tag length_value nested_elements"

Note: The length value is required in CMF-B and is a calculated value required upon transmission.

An example of a Group element in the two types of CMF representations would be: (assuming the Fuel_Reading element is an INTEGER having a tag value of 2 and default units of "Gal")

CMF-X stream format:  "<Cockpit_Readings><Fuel_Reading unit='Gal'>3</Fuel_Reading></Cockpit_Readings>"
CMF-B stream format (in binary):  "10000001 10000010 10000010 10000011"
    Comment: This is the cockpit readings tag, length=2, fuel tag, and fuel value=3.

To reset all Group elements in the two types of CMF representations the forms are:

CMF-X reset format:  "<element_name_tag *reset="Y"*>empty_tags_with_reset=Y_for_required_elements </element_name_tag>"
CMF-B reset format:  "element_binary_tag special_reset_value"

To reset individual Group elements the forms are:

CMF-X reset format:  "<element_name_tag>nested_components_with_values_and_or_reset attributes </element_name_tag>"
CMF-B reset format:  "element_binary_tag length_value nested_components_with_values_and_or_special_reset_values"

3.3.3 COMPOSITE Elements

COMPOSITE elements provide a way in CMF-B, using a single tag, to send a number of element values, all of which are known to always contain data whenever the composite group is transmitted. COMPOSITE elements are useful for CMF-B to conserve bandwidth. COMPOSITE elements are identified by the presence of the "element_type" keyword attribute (see Table 4.1.2-1) set to the value "COMPOSITE".

In CMF-B, the COMPOSITE element results in only the tag for the COMPOSITE element being sent and then all nested element values immediately follow in the order defined in the DTD but without any individual nested element tags. In CMF-X, COMPOSITE elements generate the composite element start tag, each of the nested element values preceded and terminated by their respective tags, and finally the composite element end tag. It should be noted that for CMF-B the only tags excluded by the COMPOSITE element tag are the tags of the first level of nested elements. Any elements nested under the first level of nested elements would be tagged according to their type or their respective first level element type.

Each COMPOSITE element DTD declaration contains the following:
- Attributes
    a) Element tag (not required if only a sub-component of a REPETITIVE or COMPOSITE)
    b) Element type set equal to "COMPOSITE"
- One or more other elements declared as sub-elements in the element's content model. All children of a COMPOSITE element must be declared as required elements in the COMPOSITE element's content model.

The COMPOSITE DTD element declaration takes the form:

```
<!ELEMENT Composite_Element_Name (content_model_entries)>
<!ATTLIST Composite_Element_Name keyword_name keyword_declaration>
``` where the attribute list (i.e. ATTLIST) is repeated for each keyword applied to the COMPOSITE element (or at least the contents are repeated -- both are acceptable XML forms).

An example DTD declaration for a COMPOSITE element named "Cockpit_Readings" would be:

```
<!ELEMENT Cockpit_Readings (Fuel_Reading, Airspeed_Reading)>
<!ATTLIST Cockpit_Readings reset          (Y | N) "N">
<!ATTLIST Cockpit_Readings element_tag    CDATA #FIXED "1">
<!ATTLIST Cockpit_Readings element_type   CDATA #FIXED "COMPOSITE">
```

The COMPOSITE formats for the two types of CMF representations take the following forms:

CMF-X stream format:
    "<element_name_tag>composite_component_elements_with_tags</element_name_tag>"
CMF-B stream format:    "element_binary_tag composite_component_element_values"

An example of a COMPOSITE element in the two types of CMF representations would be:    (assuming the Fuel_Reading element is an INTEGER having default units of "Gal" and Airspeed_Reading is an INTEGER having a default units of "MPH")

CMF-X stream format:    "<Cockpit_Readings><Fuel_Reading unit='Gal'>3</Fuel_Reading>
                        <Airspeed_Reading unit='MPH'>110</Airspeed_Reading>
                        </Cockpit_Readings>"
CMF-B stream format (in binary):        "10000001 10000011 11101110"
                        Comment: This is the cockpit readings tag, fuel value=3, and airspeed value=110.

To reset all COMPOSITE elements in the two types of CMF representations the forms are:

CMF-X reset format: "<element_name_tag *reset="Y"*> empty_tags_with_reset=Y_for_all_sub_elements </element_name_tag>"

CMF-B reset format: "element_binary_tag special_reset_value"

Note: A reset of a composite element resets all children component values. Accordingly, a composite element must only contain children which are reset capable. Children of a composite may not be reset individually.

3.3.4 REPETITIVE Elements

REPETITIVE elements provide a way to define one or more elements or groupings of elements and repeat them multiple times. REPETITIVE elements are useful for CMF-B to conserve bandwidth. REPETITIVE elements are identified by the presence of the "element_type" keyword attribute (see Table 4.1.2-1) and set to the value "REPETITIVE". REPETITIVE elements also have a "REQUIRED" attribute to provide the number of "element_iterations" which is therefore always included in both CMF-B and CMF-X.

In CMF-B, the REPETITIVE element results in only the tag for the REPETITIVE element being sent, the value representing the number of iterations, and then all nested element values immediately follow in the order defined in the DTD but without any individual nested element tags for the first level of nesting only. The nested element values are repeated as a group, in order, for the number of iterations indicated.

In CMF-X, REPETITIVE elements generate the repetitive element start tag including the number of iterations attribute value. Next CMF-X provides each of the nested element values preceded and terminated by their respective tags, in accordance with standard XML rules. The nested element tags and values are repeated, in order, for the number of iterations indicated.

Note that for REPETITIVE elements, any follow-on report must include all elements which are intended by the originator to be maintained by the recipient and order is significant. A reset of the REPETITIVE element resets all instances of all nested elements and a reset of one nested element resets only that nested element.

Each REPETITIVE element DTD declaration contains the following:
- Attributes
    a) Element tag (not required if only a sub-component of a REPETITIVE or COMPOSITE)
    b) Element type set equal to "REPETITIVE"
    c) Element iterations value indicating number of repetitions of component elements

- One or more other elements declared as required sub-elements in the element's content model The REPETITIVE DTD element declaration takes the form:

```
<!ELEMENT Repetitive_Element_Name (content_model_entries^X)>
<!ATTLIST Repetitive_Element_Name keyword_name keyword_declaration>
``` where X must be a "+" if the REPETITIVE element is not reset capable or alternatively, must be a "*", if the REPETITIVE element is enabled for reset capability and where the attribute list (i.e. ATTLIST) is repeated for each keyword applied to the REPETITIVE element (or at least the contents are repeated -- both are acceptable XML forms).

An example DTD declaration for a REPETITIVE element named "Cockpit_Readings" would be:

```
<!ELEMENT Cockpit_Readings ((Fuel_Reading, Airspeed_Reading)*)>
<!ATTLIST Cockpit_Readings reset                  (Y | N) "N">
<!ATTLIST Cockpit_Readings element_tag            CDATA #FIXED "7">
<!ATTLIST Cockpit_Readings element_type           CDATA #FIXED "REPETITIVE">
<!ATTLIST Cockpit_Readings element_iterations     CDATA #REQUIRED>
<!ATTLIST Cockpit_Readings min_element_iterations CDATA #FIXED "1">
<!ATTLIST Cockpit_Readings max_element_iterations CDATA #FIXED "5">
```

The REPETITIVE formats for the two types of CMF representations take the following forms:

```
CMF-X stream format: "<element_name_tag element_iterations=element_iterations_value>
                         repetitive_component_elements_with_tags</element_name_tag>"
CMF-B stream format: "element_binary_tag element_iterations_value repetitive_component_element_values"
```

An example of a REPETITIVE element in the two types of CMF representations would be:
(assuming the Fuel_Reading element is an INTEGER having default units of "Gal" and Airspeed_Reading is an INTEGER having a default units of "MPH")

```
CMF-X stream format: "<Cockpit_Readings element_iterations=2>
                         <Fuel_Reading unit='Gal'>3</Fuel_Reading>
                         <Airspeed_Reading unit='MPH'>110</Airspeed_Reading>
                         <Fuel_Reading unit='Gal'>1</Fuel_Reading>
                         <Airspeed_Reading unit='MPH'>85</Airspeed_Reading>
                      </Cockpit_Readings>"
CMF-B stream format (in binary):   "10000111 10000010 10000011 11101110 10000001 11010101 "
         Comment: This is the tag, element iterations=2, first fuel value=3, first airspeed value=110
                         second fuel value=1, and second airspeed value=85.
```

To reset all REPETITIVE iterations the forms are:
CMF-X reset format: "<element_name_tag reset="Y" element_iterations="0">
</element_name_tag>"
CMF-B reset format: "element_binary_tag special_reset_value"

To reset individual REPETITIVE iterations the forms are:
CMF-X reset format: "<element_name_tag element_iterations=element_iterations_value>
repetitive_components_with_values_and_or_reset_attributes
</element_name_tag>"
CMF-B reset format: "element_binary_tag element_iterations_value
component_values_and_or_special_reset_values"

Note: For CMF-B, a reset of the element iterations value resets all component values.

3.3.5 PACKED Elements

PACKED elements provide a way to represent two-state (i.e. Boolean) data values such as fields that are on/off, true/false, enabled/disabled, etc. This packaging type provides for efficient transmission of two-state (i.e Boolean) data elements without introducing non-inherent dependencies between them. PACKED elements are useful for CMF-B to conserve bandwidth. PACKED elements are identified by the presence of the "element_type" keyword attribute (see Table 4.1.2-1) set to the value "PACKED" and may only have PACKED COMPONENTs as children in their content model.

In CMF-X, PACKED elements generate the PACKED element start tag, the character values for each of the nested elements preceded and terminated by their respective tags, and finally the PACKED element end tag.

In CMF-B, the PACKED element results in only the tag for the PACKED element being sent and then all nested element values are provided immediately following within a special extensible byte format containing multiple PACKED_COMPONENT data representation elements (see section 3.1.2.6).

The CMF-B representation of the PACKED COMPONENT is the only case in CMF where an individual element is not defined on byte boundaries. In CMF-B rather than individually passing the character values defined for the nested components, all of the sub-components are packed together into a special extensible byte format in the form "TFxxyyzz"

> where the "T" is the termination bit indicating the final byte of the PACKED value,
> the "F" indicates to examine the individual field components or to operate on
> them as a set (i.e. 0 is illegal for "F" except in normal reset value)
> the "xx" is PACKED_COMPONENT position 1 of byte n,
> the "yy" is PACKED_COMPONENT position 2 of byte n,
> and "zz" is PACKED_COMPONENT position 3 of byte n,
> where the maximum n is the number of components divided by 3.

The "T" works as the termination indicator as it does in all other data representations (0=more bytes to follow, 1=termination or last byte).
The "F" is the field use indicator and is always set to 1 if any fields are being sent and is only set to 0 when the reset byte value (reset of entire PACKED element) is sent.

Note that the components in the packed representation are identified as to which position represents them in the structure through the order in which they are defined in the PACKED element content model. The first component declared in the content model is the position 1 component of byte 1. Undefined component positions in the lower significant bits of the final packed byte must always be transmitted as set (i.e. the reserved bit value = 3 meaning "no change").

Trailing bytes (i.e. other than the first value byte) of a PACKED element which do not have new data to report or for which all three components within the byte are no-change, do not have to be reported. This is true only as long as the components are either optional or are required and have a defined default value which is the current value. Note that this also applies ONLY to bytes occurring after all bytes for which data is being sent and may possibly be overridden by implementation rules.

Each PACKED element DTD declaration contains the following:
- Attributes
    a) Element tag (not required if only a sub-component of a REPETITIVE or COMPOSITE)
    b) Element type set equal to "PACKED"
- One or more PACKED_COMPONENT (only) elements declared as sub-elements in the element's content model The PACKED DTD element declaration takes the form:

```
<!ELEMENT Packed_Element_Name (content_model_entries)>
<!ATTLIST Packed_Element_Name keyword_name keyword_declaration>
``` where the attribute list (i.e. ATTLIST) is repeated for each keyword applied to the PACKED element (or at least the contents is repeated -- both are acceptable XML forms).

An example DTD declaration for a PACKED element named "Cockpit_Readings" would be:

```
<!ELEMENT Cockpit_Readings (Autopilot_Mode, Landing_Gear_Position?)>
<!ATTLIST Cockpit_Readings reset          (Y | N) "N">
<!ATTLIST Cockpit_Readings element_tag    CDATA #FIXED "5">
<!ATTLIST Cockpit_Readings element_type   CDATA #FIXED "PACKED">
```

An example DTD declaration for a PACKED_COMPONENT element named "Autopilot_Mode" would be:

```
<!ELEMENT Autopilot_Mode (#PCDATA)>
<!ATTLIST Autopilot_Mode reset              (Y | N) "N">
<!ATTLIST Autopilot_Mode element_type
                                CDATA #FIXED "PACKED_COMPONENT">
<!ATTLIST Autopilot_Mode defined_values   CDATA #FIXED "On=1 | Off=2">
<!ATTLIST Autopilot_Mode default_value    CDATA #FIXED "Off">
```

The PACKED formats for the two types of CMF representations would take the following forms:

CMF-X stream format: "<element_name_tag>nested_packed_component_tags_and_elements
</element_name_tag>"
CMF-B stream format: "element_binary_tag packed_element_value"

An example of a PACKED element in the two types of CMF representations would be: (assuming two PACKED_COMPONENT elements of: Autopilot_Mode having possible values of "On" or "Off" and Landing_Gear_Position having possible values of "Up" or "Down")

CMF-X stream format: "<Cockpit_Readings>
           <Autopilot_Mode>Off</Autopilot_Mode >
           <Landing_Gear_Position>Up</Landing_Gear_Position>
     </Cockpit_Readings>"
CMF-B stream format (in binary):      "10000101 11100111"
           Comment: This is the cockpit readings tag and a byte with autopilot_bits=10,
           landing_gear_bits=01, and one unused_component_bits = 11.

To reset all defined nested packed component elements the forms are:
CMF-X reset format:  "<element_name_tag reset="Y">empty_tags_with_reset=Y_for_required_sub_elements
           </element_name_tag>"
CMF-B reset format:  "element_binary_tag special_reset_value"

To reset individual defined nested packed component elements the forms are:
CMF-X reset format:  "<element_name_tag>nested_packed_components_with_values_or_reset_attributes
           </element_name_tag>"
CMF-B reset format:  "element_binary_tag packed_element_value" where there is an individual reset
           capability within the element value for each packed component

4.0 Document Type Definition (DTD)

A Document Type Definition file defines the structure and characteristics of data used for CMF-B and CMF-X. For any particular network CMF, both B and X, is defined via a single DTD to which all participants on that network must adhere. It is also possible to embed DTD declarations within XML documents for purposes such as extending the format for system specific data requirements.

4.1 DTD Conventions

The following rules are used to create a DTD.

4.1.1 Naming Elements and Attributes

CMF element names are indicated in mixed case (i.e. Title Case) alphanumeric characters with an underscore between each separate word. Attribute names (or keywords) are indicated in all lower case alphanumeric characters with an underscore between each separate word. XML standard DTD notation is indicated in all upper case alphanumeric characters with an underscore between each separate word where possible within the standard.

4.1.2 Element Attributes

Attributes are always defined as "FIXED" where it is not necessary to send the attribute value (with the exception of the numeric tag which is defined as "FIXED" but where the value is ALWAYS sent in CMF-B in place of the standard character based tag unless the type of the element's parent eliminates the tag). Attributes are defined as "REQUIRED" where it is a requirement to always report an attribute value. The XML standard attribute type of "IMPLIED", similarly applied to CMF, allows for the attribute to optionally be sent in XML but does not allow for an inherent "declared default" in the declaration syntax (not to be confused with the CMF "default value" capability as described in 3.2.1). In addition, CMF attributes may be defined using the XML "enumerated" syntax which provides a selection of choices for an element (not to be confused with the CMF ENUMERATED element type). If an attributed defined using the "enumerated" syntax is not sent, the attribute value is assumed to be equal to the inherent "declared default" for the attribute as provided by the "enumerated" syntax.

There are pre-defined attribute names or CMF keywords which are used in the DTD to define CMF elements (see Table 4.1.2-1 and 4.1.2-2). These CMF keywords each have special meaning and provide encoding/decoding information to the specialized CMF-B parser software. Some are also used to provide values (e.g. units, accuracy, etc.) in CMF-X. Any one attribute may be defined only once for any one element of applicable type (with the exception of the "path_n" style attributes which are repeatable on each applicable element for each path number "n" - see Table 4.1.2-2).

CMF attributes provide for a number of capabilities including but not limited to:
1. Element values may be restricted by range and/or adjusted by a constant.
2. Default element units may be defined.
3. Unit indication is selectable for some elements via selectable unit attributes.
4. Accuracy indication is selectable for some elements by providing selectable accuracy attributes or accuracy range attributes.

The following tables detail the attributes defined and permitted for CMF elements:

Table 4.1.2-1 CMF Keyword List

| KEYWORD | XML ATTRIBUTE TYPE | APPLICABLE ELEMENT OR FIELD TYPES (++ - see definition) | VALUE SENT IN CMF-B | VALUE SENT IN CMF-X |
|---|---|---|---|---|
| element_tag | FIXED | All elements | Yes | No |
| element_type | FIXED | All elements | No | No |
| field_type | FIXED | FIELD elements only | No | No |
| path_exclusions | FIXED | All optional elements | No | No |
| element_iterations | REQUIRED | REPETITIVE only | Yes | Yes |
| min_element_iterations | FIXED | REPETITIVE only | No | No |
| max_element_iterations | FIXED | REPETITIVE only | No | No |
| element_pattern | FIXED | PATTERN only | No | No |
| value_min_length | FIXED | STRING only | No | No |
| value_max_length | FIXED | STRING only | No | No |
| defined_values | FIXED | Elements with values++ | No | No |
| initial_value | FIXED | Elements with values++ | No | No |
| default_value | FIXED | Elements with values++ | No | No |
| path_n_default_value. | FIXED | Elements with values++ | No | No. |
| value_qualifier | IMPLIED | INTEGER or FLOAT | Optional | Optional |
| value_lower_range | FIXED | INTEGER or FLOAT | No | No |
| value_lower_ranges | FIXED | FLOAT only | No | No |
| value_lower_range_exclusive | FIXED | FLOAT only | No | No |
| value_lower_ranges_exclusive | FIXED | FLOAT only | No | No |
| value_upper_range | FIXED | INTEGER or FLOAT | No | No |
| value_upper_ranges | FIXED | FLOAT only | No | No |
| value_upper_range_exclusive | FIXED | FLOAT only | No | No |
| value_upper_ranges_exclusive | FIXED | FLOAT only | No | No |
| value_multiplier | FIXED | INTEGER only | No | No |
| value_offset | FIXED | INTEGER only | No | No |
| default_unit | FIXED | INTEGER or FLOAT | No | No |
| path_n_default_unit | FIXED | FLOAT only | No | No |
| unit | IMPLIED | INTEGER or FLOAT | No | Yes |
| unit_equivalents | FIXED | FLOAT only | Optional | No |
| default_accuracy | FIXED | FLOAT only | No | No |
| path_n_default_accuracy | FIXED | FLOAT only | No | No |
| default_accuracies | FIXED | FLOAT only | No | No |

| KEYWORD | XML ATTRIBUTE TYPE | APPLICABLE ELEMENT OR FIELD TYPES (++ - see definition) | VALUE SENT IN CMF-B | VALUE SENT IN CMF-X |
|---|---|---|---|---|
| path_n_default_accuracies | FIXED | FLOAT only | No | No |
| accuracy | IMPLIED | FLOAT only | Optional | Optional |
| accuracy_lower_range | FIXED | FLOAT only | No | No |
| accuracy_lower_ranges | FIXED | FLOAT only | No | No |
| accuracy_upper_range | FIXED | FLOAT only | No | No |
| accuracy_upper_ranges | FIXED | FLOAT only | No | No |
| reset | enumerated | All elements | Optional | Optional |

Table 4.1.2-2 CMF Keyword Definitions

| KEYWORD | DEFINITION |
|---|---|
| element_tag | Used by CMF-B in place of the standard XML character-based start tags. Provided to indicate the start (or presence) of some CMF-B elements (see paragraphs 3.0). Each tag must be uniquely defined within the DTD. |
| element_type | Used to indicate the type of the element being defined. The type must be one of the CMF-B element types. The possible values for this attribute are detailed by element in table 3.3-1. They include the element types of "GROUP", "FIELD, "COMPOSITE", "REPETITIVE", or "PACKED". |
| field_type | Used to indicate the data representation type of the FIELD element being defined. The type can be one of the CMF-B data representation types, including "INTEGER", "ENUMERATED ", "FLOAT", "STRING", "PATTERN", or "PACKED COMPONENT". |
| path_exclusions | Identifies a list of paths to which the element is not to be reported. The paths are each defined as "n" where "n" is a path number operationally pre-assigned to a transmission medium or channel. The excluded paths are each separated by the XML option indicator (i.e. the " | " character) in the DTD exclusion declaration. Required elements can't be excluded and thus cannot have this attribute. |
| element_iterations | Provides the number of repetitions of all elements which are present within a "REPETITIVE" type group element. (See 3.1.4) |
| min_element_iterations | Provides the minimum number of repetitions of elements within a "REPETITIVE" type group element. If this keyword is not specified, the minimum number of repetitions is one. |
| max_element_iterations | Provides the maximum number of repetitions of elements within a "REPETITIVE" type group element. If this keyword is not specified, the maximum number of repetitions is unlimited. |
| element_pattern | Defines the allowable format of a PATTERN element using a set of field indicators. See sections 3.1.1.5 and 3.1.2.5. |

| KEYWORD | DEFINITION |
|---|---|
| value_min_length | Identifies the minimum number of characters required in a STRING representation element value. If value_min_length is not specified for an element, the minimum length is one. |
| value_max_length | Identifies the maximum number of characters allowed in a STRING element value. If there is no value_max_length keyword is specified for the element, the maximum length is unlimited. |
| defined_values | Provides an allowable set of values for a element. Not applicable for FLOAT and PATTERN elements. The values may be provided directly in the DTD as a character string representation or enumeration of values each separated by the XML option indicator (i.e. the " | " character). The values may alternatively be provided by reference to the allowable list via the XML DTD entity reference capability. Each element may only reference one external file. |
| initial_value | Provides a value to be assumed by a host system initially, when an element has never been transmitted, or when an element is reset. This attribute is not applicable to FLOAT elements. See section 3.2.1 for initial value explanation and usage. |
| default_value | Provides the most common value which, when provided by the producer for required elements, is not actually transmitted. This attribute is not applicable to FLOAT or PATTERN elements. It will be ignored for optional elements. These values are passed to the host as though they were actually transmitted. See section 3.2.1 for default value explanation and usage. |
| path_n_default_value | If present, identifies the default value for "path n" where "n" is a path number operationally pre-assigned to a transmission medium or channel. This attribute is not applicable to FLOAT or PATTERN elements. It will be ignored for optional elements. The presence of this attribute overrides any defined "default_value" attribute for the path. |
| value_qualifier | In CMF-X, indicates that the true value is actually something "less than" or "greater than" the element value reported in the INTEGER or FLOAT element value. For FLOAT elements, CMF-B identifies this qualification via special bits in an extension byte (see section 3.1.2.3). For INTEGER elements, CMF-B identifies this qualification via respective decrement or increment of the lower and upper range values (see section 3.1.2.1.1). Without this attribute the "greater than" and "less than" capabilities are not usable on an INTEGER or FLOAT element (FLOAT special bits=0). |
| value_lower_range | Identifies the minimum allowed value for INTEGER or FLOAT elements inclusive of the range value itself. If a lower range is not specified for an INTEGER or FLOAT element, the lower range is either zero or unrestricted, respectively. |

| KEYWORD | DEFINITION |
|---|---|
| value_lower_ranges | Identifies the minimum allowed values for each of the selectable units for FLOAT elements inclusive of the range values themselves. |
| value_lower_range_exclusive | Identifies the minimum allowed value for FLOAT elements exclusive of the range value itself (i.e. the reportable minimum is the lowest value which can be represented by the producer's accuracy capability yet higher than the exclusive value). |
| value_lower_ranges_exclusive | Identifies the minimum allowed values for each of the selectable units for FLOAT elements exclusive of the range values themselves (i.e. the reportable minimums are the lowest values which can be represented by the producer's accuracy capability yet higher than the exclusive values). |
| value_upper_range | Identifies the maximum allowed value for INTEGER or FLOAT elements inclusive of the range value itself. If an upper range is not specified for an element, the upper range is unrestricted. |
| value_upper_ranges | Identifies the maximum allowed values for each of the selectable units for FLOAT elements inclusive of the range values themselves. |
| value_upper_range_exclusive | Identifies the maximum allowed value for FLOAT elements exclusive of the range value itself (i.e. the reportable maximum is the highest value which can be represented by the producer's accuracy capability yet less than the exclusive value). |
| value_upper_ranges_exclusive | Identifies the maximum allowed values for each of the selectable units for FLOAT elements exclusive of the range values themselves (i.e. the reportable maximums are the highest values which can be represented by the producer's accuracy capability yet less than the exclusive values). |
| value_multiplier | Provides a constant with which to multiply the transmitted value to determine the actual reported value. (Note: a defined value_offset is applied to transmitted values prior to the value_multiplier) This constant multiplier allows for more efficient usage of bandwidth by reducing the transmitted size of integers or by allowing what would normally be reported as multiples of a fixed point value to be transmitted in the more space efficient INTEGER. Due to resulting limited extensibility, this attribute should be utilized sparingly. |
| value_offset | Provides a constant with which to add to the transmitted value to determine the actual reported value. (Note: a defined value_multiplier is always applied to transmitted values after any defined value_offset) This constant offset allows for more efficient usage of bandwidth by allowing what would normally be reported as a fixed point value to be transmitted in the more space efficient INTEGER or what is normally a negative integer to be scaled fully into the positive INTEGER range. Due to resulting limited extensibility, this attribute should be utilized sparingly. |

| KEYWORD | DEFINITION |
|---|---|
| default_unit | Provides the unit to be assumed on data receipt in the absence of a transmitted unit. For FLOAT elements, can be overridden by a "unit" attribute sent in CMF-X or a unit equivalent value in CMF-B. |
| path_n_default_unit | Identities the default unit for "path n" where "n" is a path number operationally pre-assigned to a transmission medium or channel. The presence of this attribute overrides any defined "default_unit" attribute for the path identified. |
| unit | The character representation of the unit selection is transmitted in CMF-X. The "unit" attribute is declared along with one or multiple possible character unit selections (using XML "IMPLIED" attribute syntax). If defined and available, the unit indication is always provided for the "composite path" unless the element is reset. For INTEGER elements, only one unit selection may be defined. Only that unit selection is transmitted in CMF-X and no unit indication is transmitted in CMF-B. For FLOAT elements, unit is optionally reported on CMF-X as one of the defined set of unit selections in order to indicate the unit and/or override any default unit for a reported element value. On CMF-B the equivalent numerical enumerations of the character unit selections are provided in a "unit_equivalents" attribute. The enumeration value is sent in CMF-B and the special unit extension bit is set to one. Without the unit attribute defined for an element, unit indication and FLOAT selectable unit capability are not supported on the element (special unit bit=0). |
| unit_equivalents | Provides the respective enumerations (i.e. numerical values) for each possible character unit selection defined for the "unit" attribute of a FLOAT element. Permits numerical indication of unit selection in CMF-B (see unit attribute definition). |
| default_accuracy | Provides an accuracy to be assumed on data receipt in lieu of that indicated inherently by the floating point value transmitted. The accuracy indicated by this attribute is overridden if the "accuracy" attribute value is reported with the element value. |
| path_n_default_accuracy | Provides a default accuracy for "path n" where "n" is a path number operationally assigned to a transmission medium or channel. The presence of this attribute overrides any defined "default_unit" attribute for the path identified. |
| default_accuracies | Provides the same type information as the "default_accuracy" keyword, but provides multiple default accuracy values for when more than one possible unit is defined for the element. |

| KEYWORD | DEFINITION |
|---|---|
| path_n_default_accuracies | Provides the same type information as the "path_n_default_accuracy" keyword, but provides multiple default accuracy values for the identified path for when more than one possible unit is defined for the element. |
| accuracy | The declaration of this attribute permits accuracy to be reported (other than just implied). Optionally reported as a value within separate upper and lower accuracy ranges to override the implied accuracy for a reported element value. Absence of one or more of the range limitations leaves any respective range unrestricted. Reported as character scientific notation for CMF-X and as FLOAT for CMF-B. |
| accuracy_lower_range | Provides the lower range or minimum value allowed for the "accuracy" attribute value. |
| accuracy_lower_ranges | Provides the lower ranges or minimum values for each of the selectable units of an element allowed for the "accuracy" attribute value. |
| accuracy_upper_range | Provides the upper range or maximum value allowed for the "accuracy" attribute value. |
| accuracy_upper_ranges | Provides the upper ranges or maximum values for each of the selectable units of an element allowed for the "accuracy" attribute value. |
| reset | Indicates whether the element is to be reset to the No Data or Initial Value state. Valid "reset" attribute values are "Y" for yes or "N" for no. The attribute is not required to be sent with the "N" value. If the reset condition is to be indicated, the character "Y" value is sent in CMF-X or the special zero value is sent in CMF-B (see section 3.2.2). Presence of the reset condition normally inhibits the transmission of other non-required attributes. |

4.1.3 CMF Data Validation and Verification

As mentioned previously, XML prescribes two terms for the checking of data; "well formed" and "valid". All XML data must be "well formed" in that it must follow the standard XML syntax for identifying elements and providing values. Being "well formed" does not guarantee that XML data adheres to any specific content model structure or that the data is limited to any definite elements or data attributes, but only ensures proper syntax and nesting. Authentication of the content model structure as well as application of element and attribute limitations is called "validation" by the XML standard. Validation of the data is done against the structure, elements and attributes as declared in a DTD, therefore use of a DTD is required for data validation. XML also provides a defined syntax and structure which must be applied to a DTD as DTDs must always be both "well formed" and "valid".

The XML standard allows for an XML parser to check that XML data is "well formed" without also checking if it is "valid". XML parsers which also check data validity are called "validating parsers". The CMF Parser Library may selectively operate as a "validating parser" on CMF-X data, but since it is not physically possible to parse CMF-B data without a DTD, CMF-B data must ALWAYS be validated.

CMF is consistent in the use of "well-formed" and "valid" as defined by the XML standard. CMF also extends the criterion of DTD validation to ensure that the syntax and structure of a CMF DTD meets the enhanced syntax and structure required by the CMF implementation to include the CMF-defined keyword attributes.

CMF-X being a subset implementation follows the XML standard for "well-formed" and "valid". CMF-B being a binary derivative clearly does not follow the exact rules, but follows corollary and equivalent rules for "well-formed" as identified in sections 3.1 through 3.3 and utilizes the same DTD as CMF-X for data validation.

Additionally, CMF provides for "verification" of the CMF-defined keyword attributes and rules against CMF data as an additional data checking criterion. "Verification" is the checking of CMF data against the DTD-defined ranges, units, accuracies, resets, etc. Verification of data can only occur if the data is also validated. CMF verification applies to both CMF-X and CMF-B.

Element values MUST ALWAYS be verified against ALL applicable attribute definitions in the DTD including any external files (i.e. range, defined values, etc.) on transmission. On CMF data receipt, it is optional to perform full checking or only sufficient checking to identify resets, identify elements, and to parse the elements for passage to the application level.

The CMF Parser Library provides functionality which automatically verifies CMF data according to the defined DTD elements and attributes on transmission into CMF. The Parser Library allows the application to enable or disable verification on CMF data receipt. Disabling of verification on receipt is recommended because receipt verification limits flexibility with respect to future backward compatible modifications. Additional considerations include performance or memory limitations. Disabling of verification relieves any need to have the files externally referenced by the DTD loaded into memory (see defined_values attribute in table 4.1.2.2-1). Additionally the verification of values within externally referenced files may be separately enabled or disabled.

4.2 DTD Maintenance

The following rules are to be observed when modifying the DTD.

4.2.1 Version Tracking

There are four version numbers that all producers must include in all CMF data packages (i.e. documents); the major parser interface version, minor parser interface version, major DTD version, and minor DTD version. These version numbers are defined as a required part of the CMF package element and are always the first values in the package in this order.

4.2.1.1 Parser Interface Version Changes

Parser interface definition changes are expected to be rare as a design goal of CMF. Conceivable changes would include changes necessary to take advantage of advancements in the XML standard, potential undetected errors in the original release, or possibly new data representations for some as yet unknown type of data.

4.2.1.1.1 Major Parser Interface Version Changes

The major parser interface version indicates changes that are not backward compatible with the previous parser software library interface definition. A major parser interface version change requires all producers and consumers to update their parser software library prior to processing the latest CMF data.

4.2.1.1.2 Minor Parser Interface Version Changes

The minor parser interface version indicates changes that are backward compatible with the previous parser software library interface definition.

4.2.1.2 DTD Version Changes

As a primary tenet of the CMF design, data format changes are to be done via a DTD rather than in Parser software. Therefore, DTD version changes are expected to be common as producer and user data requirements evolve. Conceivable changes would include, but not be limited to, such requirements as additional data elements to support new technologies, new data precision capabilities requiring extended range, element rearrangement to support enhanced grouping transmission efficiency, or removal of unused data.

4.2.1.2.1 Major DTD Version Changes

The major DTD version identifies changes that are not backward compatible with the previous DTD. A major DTD version change requires all producers and consumers to update their DTD prior to processing the latest CMF data. Major changes include modification of existing elements or addition of elements depending on the extent or placement of the modification or addition.

4.2.1.2.2 Minor DTD Version Changes

A minor DTD version identifies changes that are backward compatible and processing can continue without a DTD update, though possibly, without full use of all DTD elements or capabilities.

Minor changes include adding new elements, or some changes to element ranges and/or other attributes. For example, an element added as a sub-element to the end of an existing group element is a minor change because the group length would indicate the new element's presence. Therefore the parser can ignore the unknown element and still easily find the next known element tag.

Additionally changes to ranges and/or other attributes could potentially be considered and indicated as minor changes if, operationally, it is deemed that not all producers and/or consumers must immediately support the range change. Identification of minor changes requires careful consideration for the exact change and its operational impacts, but has the potential, where feasible, to greatly simplify the implementation, coordination, and fielding of a required DTD change.

4.2.1.3 Version Mismatch Checking

The current parser interface version numbers are available to a CMF application from the parser library itself. The major and minor DTD version numbers are provided within the DTD and are also made available to the CMF application level. The parser library software will support the check of the parser and DTD versions used to create each received CMF-B or CMF-X data package with the versions in use by the receiving unit and mismatches will be reported, if supported by the application level. All CMF applications, where physically possible, should at a minimum support reporting of all version numbers and mismatches. It is recommended that all CMF applications inhibit continued CMF operation if major level version mismatches occur. The parser library will support automatic inhibit on major level version mismatch, if enabled by the CMF application.

Due to configuration management processes, unanticipated major level mismatches are to be unlikely and rare. Nevertheless, continued operation is dependent upon whether the mismatch is at a major or minor version level combined with an operational decision weighing downtime versus a potentially critical data misinterpretation error. An override of a major version mismatch will likely have undesirable results, including probable failures.

4.2.2 Miscellaneous Maintenance Guidelines

- The smallest numeric tags must be assigned to the most frequently used elements in order to minimize bandwidth usage.

- When the Parser encounters unexpected data, the data may or may not be parsable. The Parser will return the unexpected data in either their unparsed or parsed state along with the associated message identifying the data as unexpected.

- A DTD change might be backward compatible with the immediately preceding version of the DTD, but not with the versions before that.

- Often the decision to deem a DTD change "Minor" or "Major" will be contingent not on a specific data representation or packaging structure rule, but on operational necessity and concerns. For instance, changing an element in a non-backward compatible way when it is used commonly by many CMF users would probably require a "Major_DTD_Version" increment because it is desirable that ALL users utilize the field correctly. However, if a field were deemed to be only used by a small portion of the users, the same non-backwards compatible change might be intentionally deemed a "Minor_DTD_Version" increment (if, and only if, it did not impair the Parser's synchronization with the rest of the data in any way). The small group of CMF users requiring the piece of information would need to be informed of the change and receive a new DTD in order to utilize the supporting element(s). However, in this example the majority of the users would not need to immediately change DTDs if they did not care about the element in question.

- Most changes which would not cause loss of data and would never be noticed by a non-verifying system are deemed "Minor". Many such changes will be "highly necessary" for all producers to begin implementing and therefore each will need a new DTD, but the change may only be a range change, adding a new mnemonic, or another change that will not impair a receive-only unit which does not verify received data. The "Minor_DTD_Version" marking would allow the receive-only systems to gradually change to the new DTD. Yet, producers and verifying systems needing the data immediately can utilize the data change with a new DTD.

- The CMF parser will allow the addition of new attributes to the standard, but will provide a warning when an attribute which it does not recognize is encountered in a DTD. The new attribute will also not receive any further processing.

- Tabs should be utilized as insignificant whitespace rather than spaces, where possible, in DTD definitions to minimize DTD object size in memory 4.2.2.1 Additional DTD Criterion and Attribute Limitations Table 4.2.3.1-1 provides information concerning considerations for declaring and validating attributes and structure of DTDs.

Table 4.2.3.1-1 Additional DTD Criterion and Attribute Limitations

| | | CRITERION / LIMITATION |
|---|---|---|
| | GLOBAL CHECKS | |
| | | All tags must be uniquely numbered. |
| | | Each tag must be declared by only one element. |
| | | The root element must be an element type of GROUP. |
| | | The root element must have an element tag defined. |
| | | All elements must have an element type attribute. |
| | | All element types must be one of the five: GROUP, FIELD, COMPOSITE, REPETITIVE, or PACKED. |
| | | The content model for element types other than FIELD cannot contain #PCDATA. |
| | | The content model for all element types other than FIELD must contain at least one child element. |
| | | All child elements of a GROUP element must have a tag. |
| | | All attributes must be assigned only to applicable elements per Table 4.1.2-1 and 4.1.2-2. |
| | | All reset attributes must be declared with the values Y\|N or N\|Y. |
| | | The declared default for all reset attributes must be 'N'. |
| | | All attributes must be declared with the appropriate XML attribute type per 4.1.2-1. |
| | | Element attributes must match the correct syntax according to the defined element and field type. |
| | | For unit lists, white space in labels or values is illegal and is not significant elsewhere. This includes upper/lower ranges, upper/lower ranges exclusives, (path_n)default accuracies, and upper/lower accuracy ranges. |
| | | Unit list selections must be separated by "or" bars. |
| | | Unit list labels and values must be separated by equal signs. |
| | | Unit list labels must be one of the defined unit equivalents labels. |
| | | Unit list values must be declared in integer or float form. |
| | | For enumerated lists, white space in labels or values is illegal and is not significant elsewhere. This includes defined values for field types of ENUMERATED or PACKED COMPONENT and unit_equivalents for field_types of FLOAT. |
| | | Enumerated list labels and values must be unique. |
| | | Enumerated list selections must be separated by "or" bars. |
| | | Enumerated list labels and values must be separated by equal signs. |
| | | Enumerated list values must be declared in integer form. |

| | | CRITERION / LIMITATION |
|---|---|---|
| | | For value lists, white space within values when the field type is FLOAT or INTEGER is illegal and is not significant elsewhere. |
| | | For value lists, non-trailing white space within values when the field type is STRING is significant and trailing white space is significant up to the value min length. |
| | | For value lists, STRING values must contain at least as many characters as defined by the value min length. |
| | | For value lists, the form of the declared values must match the field type (e.g. FLOAT, INTEGER, STRING). |
| | | For value lists, the values must be separated by "or" bars. |
| | | If an element is resettable, all children of the element must be resettable. |
| | | Non-PACKED elements can not have PACKED_COMPONENTS. |
| | | All initial values must match the field type, the defined values, and must be within defined ranges. |
| | | All children of a PACKED element must have a field type of PACKED_COMPONENT. |
| | | All element_tag attributes must have an associated tag reference. |
| | | Elements having defined 'path_exclusions', cannot have any 'path_n' attributes for the excluded paths *(Warning message only)*. |
| | | Required elements can not have any defined 'path_exclusions'. |
| | | The form must be integer for all element_tag values. |
| | | Undeclared Element tags will result in a *warning* message from the parser. |
| | | The Package_Description_data, DTD version, and Parser version elements must be declared with the exact and non-abbreviated spelling and must always be the first elements declared after the CMFDoc element. |
| | | An element's content model cannot reference itself. |
| | | The content model of GROUP or PACKED elements which are enabled for reset capability must not contain any individual non-grouped optional elements (i.e. optional elements which are not grouped by parenthesis) or any groupings of elements (i.e. grouped by parenthesis) which result in an element being defacto required even though all elements are individually optional or mutually exclusive. An example of a required grouping consisting of all optional elements would be three optional elements A, B, and C existing in a content model grouping such as (A | B | C). In this case, although each of the individual elements is optional, at least one is required, thus this example content model definition is not resettable. The presence of "+" and the "|" indicators without enclosing "?" or "*" indicators tend to result in defacto required elements. |

| | | CRITERION / LIMITATION |
|---|---|---|
| | | All element content models of GROUP or PACKED elements which are both enabled for reset and contain any individual non-grouped required elements or any groupings of elements which result in an element being required even if all elements are individually optional or mutually exclusive must have the entire content model made optional (i.e. a "?" added to the entire content model). An example of a required grouping consisting of all optional elements would be three optional elements A, B, and C existing in a content model grouping such as (A \| B \| C). |
| | | The content model of GROUP or PACKED elements which are enabled for reset capability must not contain any individual repeatable elements or groupings of elements using the "+" which result in an element being required even if all elements are individually optional or mutually exclusive. An example of defacto required element content models consisting of some optional elements would be an individual element A using the "+" such as (A+) or a grouping with elements A, B, and C defined as ((A, B)+, C). In this case, although some of the element repetitions are optional, at least one is required, thus this example content model is not resettable. |
| | | All element content models of GROUP or PACKED elements which are both enabled for reset and contain any individual repeatable elements or groupings of elements using the "+"which result in an element being required even if all elements are individually optional or mutually exclusive must have the entire content model made optional (i.e. a "?" added to the entire content model). An example of defacto required element content models consisting of some optional elements would be an individual element A using the "+" such as (A+) or a grouping with elements A, B, and C defined as ((A, B)+, C). |
| | | Default_values and path_n_default_values may be defined for optional elements but are only utilized for removal and insertion on required elements. For example if an element belongs to a GROUP and is optional and that same element belongs to another GROUP and is required, it is permissable to have a default, but only the "required" instance will utilize the default. |
| | | Elements which are path excluded must be optional for all content models where they appear in the DTD (i.e. if an element is a child element in two places; one optional and one required, and it is necessary to eliminate the element from the optional usage on some paths via path-exclusion, two separate elements must be defined). |
| | | The declaration of path_n_default_accuracy or path_n_default_accuracies does not require the declaration of a main default accuracy. This enables the non-path data to utilize an implied accuracy. |
| | | The enumerations for a value_qualifier must only be declared as "GREATER_THAN" and/or "LESS_THAN". |

| | | CRITERION / LIMITATION |
|---|---|---|
| | | External files entries must be unique: duplicate names with differing numeric values (RED=1\|RED=2) is not permitted; duplicate numeric values for differing enumerated names (RED=1\|BLUE=1)is not permitted; duplicate "entire entries" where both names and numeric values match (RED=1\|RED=1) is a warning |
| | | External file entries must be unique. |
| | | Each external file reference must have a unique file path. |
| | | External file entries must not have duplicate names with differing numeric values (e.g. RED=1\|RED=2). |
| | | External file entries must be not have duplicate numeric values for differing enumerated names (e.g. RED=1\|BLUE=1). |
| | | External file entries in which the entire entry is a duplicate of another entry such that both names and numeric values match (e.g. RED=1\|RED=1) will result in a warning message from the parser. |
| | | External files can be referenced by only one element. |
| | | An element can only reference one external file. |
| FIELDS | | |
| | global checks for element type FIELD | |
| | | All element types of "FIELD" must also have a "field type" attribute. |
| | | FIELD elements must have a field type of one of the 6 types: INTEGER, FLOAT, PATTERN, ENUMERATED, STRING, or PACKED COMPONENT. |
| | | All declared default values must be consistent with their field type. |
| | | If a path_n_default_value is declared, a default value must also be declared. |
| | | If a path_n_default_unit is declared, a default unit must also be declared. |
| | | The content model for FIELD elements must contain and only contain (#PCDATA). |
| | field type - INTEGER: | |
| | | All declared defined values must be numerically within any declared ranges. |
| | | All declared (path_n_)default_values must be one of the defined values (if defined values are declared) and/or must be within any declared ranges. |
| | | Any declared value_lower_range must be less than or equal to any declared value_upper_range. |
| | | If a default_unit or unit is declared, then both must be declared and the values must match (note only one value can be defined). |
| | | The values for value_multiplier attributes must be declared in the form of an integer, decimal number, or scientific notation number. |
| | | The values for value_offset attributes must be declared in the form of an integer, decimal number, or scientific notation number. |

| | | CRITERION / LIMITATION |
|---|---|---|
| | | If an element's value_qualifier attribute defines the "LESS_THAN" condition, then value_lower_range must be declared and must be greater than or equal to 1. |
| | | If an element's value_qualifier attribute defines the "GREATER_THAN" condition, then value_upper_range must be declared. |
| | field type - FLOAT: | |
| | | A declared value lower range must be less than or equal to any declared value upper range. |
| | | A declared value lower range exclusive must be less than any declared value upper range |
| | | A declared value lower range must be less than any declared value upper range exclusive |
| | | A declared value lower range exclusive must be less than any declared value upper range exclusive |
| | | An element may not have both a value lower range exclusive and a value lower range declared. |
| | | An element may not have both a value upper range exclusive and a value upper range declared. |
| | | An element may not have both a value upper range and value lower ranges declared. |
| | | An element may not have both a value lower range and value upper ranges declared. |
| | | If a (path_n_)default_unit is declared, then unit_equivalents and unit must both be declared and the declared (path_n_)default_unit value must be one of the selections in the unit_equivalents. |
| | | If a unit_equivalents is declared, a unit attribute must also be declared, and the unit label entries must match the unit_equivalent label entries. |
| | | If a unit is declared, a unit_equivalents attribute must also be declared. |
| | | All unit_equivalents values must be unique. |
| | | All unit_equivalents names (i.e. labels) must be unique . |
| | | If a path_n_default_unit is declared, a default_unit must also be declared. |
| | | If more than one selection is declared for unit_equivalents, only the plural value lower or upper_ranges may be declared (i.e. not the singular value lower or upper_range). |
| | | If more than one selection is declared for unit_equivalents, only the plural value lower or upper_range_exclusives may be declared (i.e. not the singular value lower or upper_range_exclusive). |
| | | If more than one selection is declared for unit_equivalents, only the plural default_accuracies may be declared (i.e. not the singular default_accuracy). |
| | | If more than one selection is declared for unit_equivalents, only the plural path_n_default_accuracies may be declared (i.e. not the singular path_n_default_accuracy). |

|  | | CRITERION / LIMITATION |
|---|---|---|
|  |  | If more than one selection is declared for unit_equivalents, only the plural lower or upper_accuracy_ranges may be declared (i.e. not the singular lower or upper_accuracy_range). |
|  |  | If default_accuracy is declared, the value must be within, or equal to any declared lower and upper_accuracy_range. |
|  |  | If default_accuracies is declared, the values must be within, or equal to any declared lower_ and upper_accuracy_ranges according to the respective unit. |
|  |  | If only one selection is declared for unit_equivalents, only the singular value lower or upper_range may be declared (i.e. not the plural value lower or upper_ranges). |
|  |  | If only one selection is declared for unit_equivalents, only the singular value lower or upper_range_exclusive may be declared (i.e. not the plural value lower or upper_ranges_exclusive). |
|  |  | If only one selection is declared for unit_equivalents, only the singular default_accuracy may be declared (i.e. not the plural default_accuracies). |
|  |  | If only one selection is declared for unit_equivalents, only the singular path_n_default_accuracy may be declared (i.e. not the plural path_n_default_accuracies). |
|  |  | If only one selection is declared for unit_equivalents, only the singular lower or upper_accuracy_range may be declared (i.e. not the plural lower or upper_accuracy_ranges). |
|  |  | If any of the accuracy ranges are declared, the accuracy attribute must be declared. |
|  |  | Both lower_accuracy_range and lower_accuracy_ranges cannot be declared at the same time for the same element. |
|  |  | Both upper_accuracy_range and upper_accuracy_ranges cannot be declared at the same time for the same element. |
|  |  | Any declared lower_accuracy_range must be less than or equal to any declared upper_accuracy_range. |
|  |  | Any declared lower_accuracy_ranges value for a particular unit must be less than or equal to any declared upper_accuracy_ranges value for the same unit. |
|  |  | Accuracy attribute values cannot be negative. |
|  |  | If a "(path_n_)default_value" and a unit attribute are declared, a corresponding (path_n_)default_unit or a default unit must also be declared. |
|  |  | All values for declared "(path_n_)default_value" and unit attributes must be within any value lower and upper ranges for the corresponding unit. |
|  |  | Any unit value declared within value lower or upper ranges, accuracy ranges, and "(path_n_)default_accuracies" must also be declared in the "unit" attribute. |
| field type - ENUMERATED: |  |  |
|  |  | All enumerations must have one or more defined_values declared. |

| | | CRITERION / LIMITATION |
|---|---|---|
| | | All declared (path_n_)default_values must be one of the declared defined values. |
| | | Defined_values entries must be unique. |
| | | Defined_values entries must not have duplicate names with differing numeric values (e.g. RED=1|RED=2). |
| | | Defined_values entries must be not have duplicate numeric values for differing enumerated names (e.g. RED=1|BLUE=1). |
| | | Defined_values entries in which the entire entry is a duplicate of another entry such that both names and numeric values match (e.g. RED=1|RED=1) will result in a warning message from the parser. |
| | field type - STRING: | |
| | | If value_min_length or value_max_length are declared, their values must be greater than zero. |
| | | If value_min_length and value_max_length are both declared, the value_min_length value must be less than or equal to the value_max_length value. |
| | | Declaration of values for the value_min_length or value_max_length must be in the form of an integer. |
| | | If a (path_n_)default_value is declared, the declared value must be one of any declared defined_values and/or within any declared value min or max lengths. |
| | | If 'defined_values' is declared, each declared value must satisfy any declared value min or max lengths. |
| | field type - PACKED COMPONENT: | |
| | | Any declared value for a (path_n_)default_value must be one of the declared defined_values. |
| | | A 'defined_values' attribute must be declared with either 1 or 2 enumerated values and those numerical values must be equal to '1' and/or '2'. |
| | | |
| | field type - PATTERN | |
| | | An element_pattern attribute must be declared. |
| | | Any declared patterns must follow the form of character count, field ID, char count, field ID, etc. |
| | | Any declared patterns must be declared with proper Field ID syntax. |
| | | For each declared pattern, the simplest form of each component within exclusives must match. The set of components and their forms (except subcomponent ranges) within exclusive Field ID groups must match exactly (i.e. can not have [1A1A] and [2A], but could have [1D1A] with [1A1A] since simplest form for both would be 1Z1Z). |
| | | The values for any declared (path_n_)default_value must match the defined element_pattern. |
| | | If any subcomponent ranges with a pattern overlap (e.g. one ranged 1-20 and the other ranged 15-30) a "warning" message will be output by the parser. |

| | | CRITERION / LIMITATION |
|---|---|---|
| | PACKED | |
| | global checks for element type PACKED | |
| | | All elements declared as children in the content model must have a field type of PACKED_COMPONENT. |
| | | All elements declared as children in the content model must be non-repeatable and can not be mutually exclusive (i.e. no "+" or "*" or "\|"). |
| | COMPOSITE | |
| | global checks for element type COMPOSITE | |
| | | All elements declared as children in the content model must be required (i.e. no '*' or '?'). |
| | | all elements declared as children in the content model must be non_repetitive (i.e. no "+" or "\|" ). |
| | REPETITIVE | |
| | global checks for element type REPETITIVE | |
| | | An "element_iterations" attribute must be declared for all elements. |
| | | All elements, or groupings of elements declared as children in the content model must be required and non-repeatable (i.e. no '*' or '?' or '\|' or '+'). |
| | | If the element is enable for reset capability, then the entire content model must end with the '*' indicator or if not enabled for reset capability it must end with the '+' indicator. |
| | | If min_element_iterations and max_element_iterations are both declared, the min_element iterations value must be less than or equal to the max_element_iterations value. |
| | | Declaration of values for the min_element_iterations or max_element_iterations must be in the form of an integer. |
| | | The declared value for min_element_iterations must be greater than or equal to one. |
| | | The declared value for max_element_iterations must be greater than or equal to one. |
| | | If multiple children are declared, all child elements in the content model must be enclosed by parenthesis. |
| | GROUP | |
| | global checks for element type GROUP | |
| | | All children within the content model of a GROUP element must have tags defined. |

Appendix A - DTD Views
A.1 Example DTD Graphical View
A.1.1 Package_Delivery_System Root Element
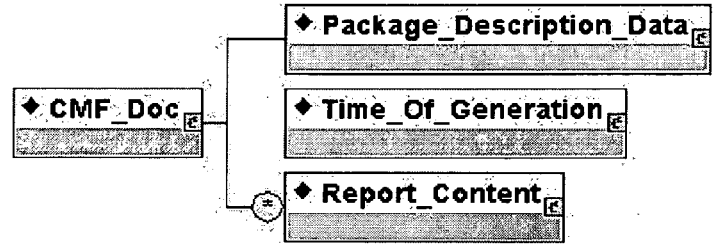
A.1.1.1 Package_Description_Data Element
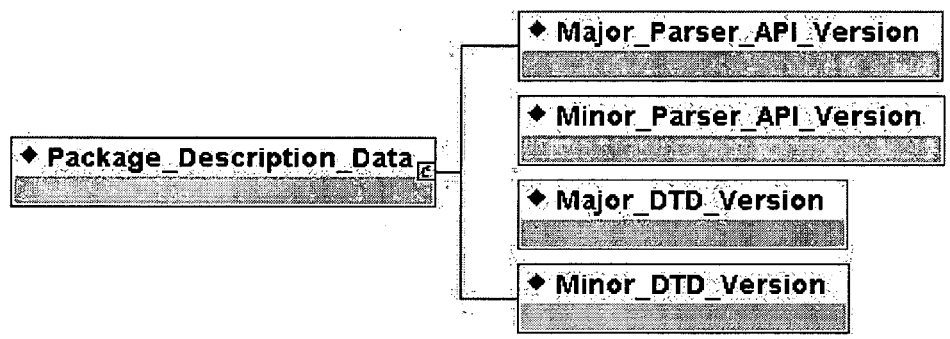
A.1.1.2 Time_Of_Generation Element
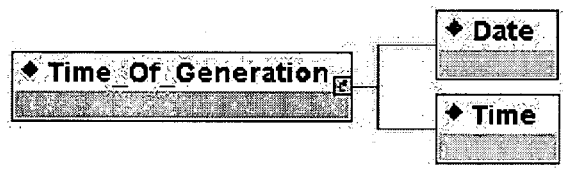
A.1.1.3 Report_Content Message
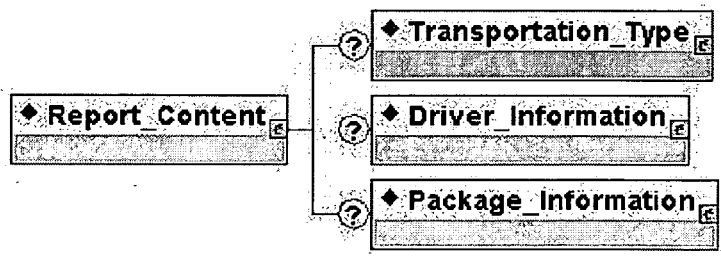
A.1.1.3.1 Transportation_Type_Element

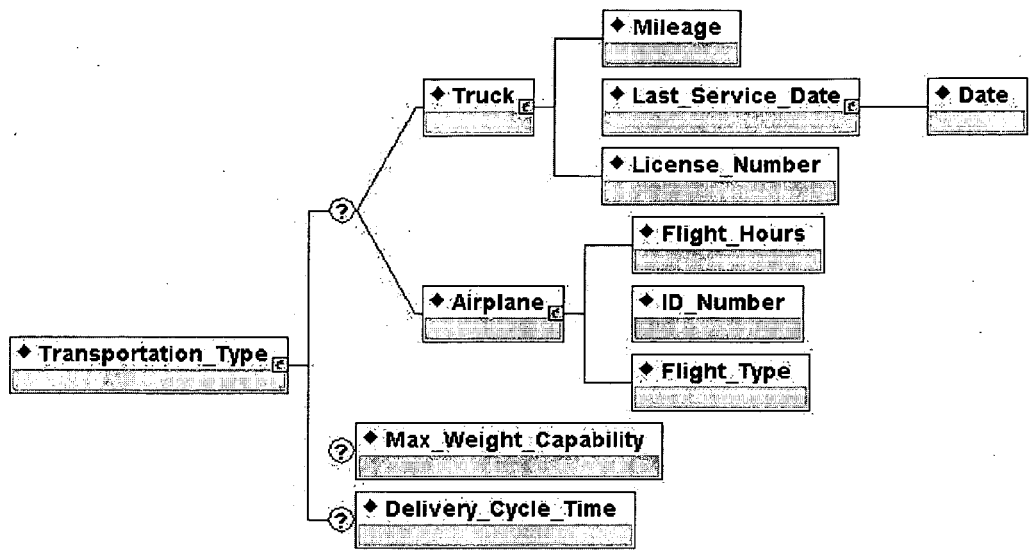
A.1.1.3.2 Driver_Information_Element
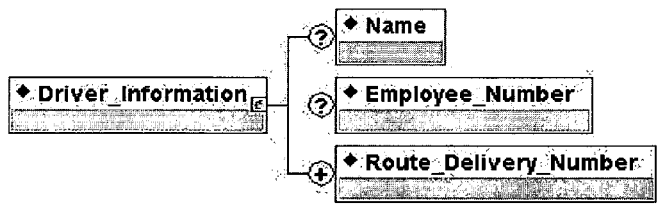
A.1.1.3.3 Package_Information_Element
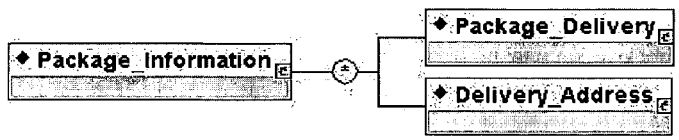
A.1.1.3.3.1 Package_Delivery Element

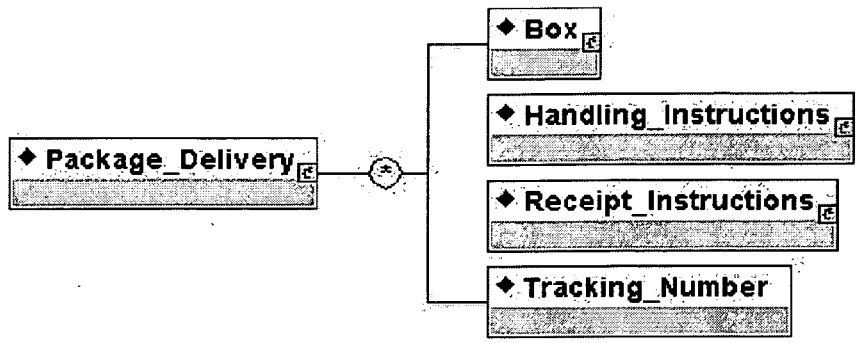
A.1.1.3.3.1.1 Box Element
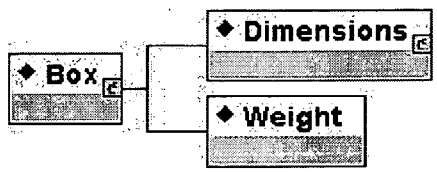
A.1.1.3.3.1.2 Handling_Instructions Element
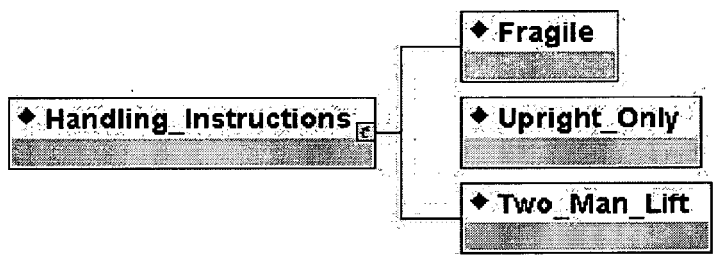
A.1.1.3.3.1.3 Receipt_Instructions_Element
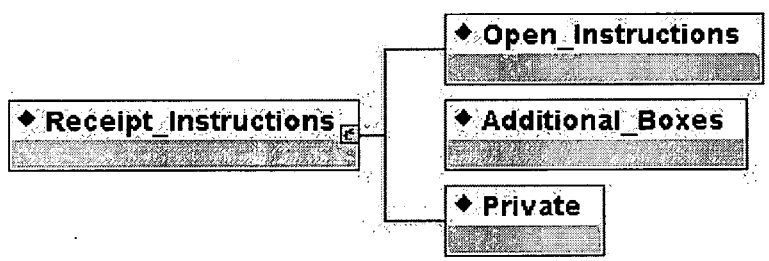
A.1.1.3.3.2 Delivery_Address
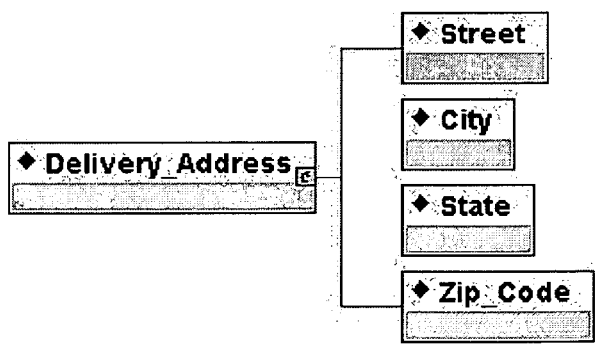

A.2 Example DTD Text View

A.2.1 Package_Delivery_System DTD File

The following example DTD file provides a hypothetical but representative example of the defined capabilities of CMF. The example DTD would be located in the same directory as the example XML data with a file name of "Package_Delivery_System.dtd". Working examples of both CMF-X and CMF-B which are based upon this example DTD are provided in Appendix B.

Table A.2.1-1 Package_Delivery_System DTD File Listing

```
<?xml encoding='UTF-8' ?>
<?CMF_Application DTD_Version='1.1'?>

<!ENTITY % state_abbreviation_file SYSTEM "CMF_Mnemonics/State_Abbreviation_File.txt">

<!ENTITY PACKAGE_DELIVERY_SYSTEM_TAG "1">
<!ENTITY PACKAGE_DESCRIPTION_DATA_TAG "100">
<!ENTITY TIME_OF_GENERATION_TAG "2">
<!ENTITY REPORT_CONTENT_TAG "3">
<!ENTITY TRANSPORTATION_TYPE_TAG "4">
<!ENTITY TRUCK_TAG "5">
<!ENTITY AIRPLANE_TAG "6">
<!ENTITY MAX_WEIGHT_CAPABILITY_TAG "7">
<!ENTITY DELIVERY_CYCLE_TIME_TAG "8">
<!ENTITY DRIVER_INFORMATION_TAG "9">
<!ENTITY NAME_TAG "10">
<!ENTITY EMPLOYEE_NUMBER_TAG "11">
<!ENTITY ROUTE_DELIVERY_NUMBER_TAG "12">
<!ENTITY PACKAGE_INFORMATION_TAG "13">
<!ENTITY PACKAGE_DELIVERY_TAG "14">
<!ENTITY BOX_TAG "15">
<!ENTITY DIMENSIONS_TAG "16">
<!ENTITY HANDLING_INSTRUCTIONS_TAG "17">
<!ENTITY RECEIPT_INSTRUCTIONS_TAG "18">
<!ENTITY DELIVERY_ADDRESS_TAG "19">
<!ENTITY LAST_SERVICE_DATE_TAG "22">

<!-- ****** -->
<!ELEMENT CMF_Doc   (Package_Description_Data, Time_Of_Generation, Report_Content*)>
<!ATTLIST CMF_Doc   element_tag    CDATA #FIXED '&PACKAGE_DELIVERY_SYSTEM_TAG;'
                    element_type   CDATA #FIXED 'GROUP'>
<!-- ****** -->
<!ELEMENT Package_Description_Data (Major_Parser_API_Version, Minor_Parser_API_Version,
Major_DTD_Version, Minor_DTD_Version)>
<!ATTLIST Package_Description_Data  element_tag  CDATA #FIXED '&PACKAGE_DESCRIPTION_DATA_TAG;'
                                    element_type CDATA #FIXED 'COMPOSITE'>
<!-- ****** -->
<!ELEMENT Major_Parser_API_Version  (#PCDATA)>
<!ATTLIST Major_Parser_API_Version  element_type      CDATA #FIXED 'FIELD'
                                    field_type        CDATA #FIXED 'INTEGER'
                                    value_lower_range CDATA #FIXED '0'
                                    value_upper_range CDATA #FIXED '127'>
<!-- ****** -->
<!ELEMENT Minor_Parser_API_Version  (#PCDATA)>
<!ATTLIST Minor_Parser_API_Version  element_type      CDATA #FIXED 'FIELD'
                                    field_type        CDATA #FIXED 'INTEGER'
                                    value_lower_range CDATA #FIXED '0'
                                    value_upper_range CDATA #FIXED '127'>
```

```
<!-- ****** -->
<!ELEMENT Major_DTD_Version (#PCDATA)>
<!ATTLIST Major_DTD_Version element_type       CDATA #FIXED 'FIELD'
                            field_type         CDATA #FIXED 'INTEGER'
                            value_lower_range  CDATA #FIXED '0'
                            value_upper_range  CDATA #FIXED '127'>
<!-- ****** -->
<!ELEMENT Minor_DTD_Version (#PCDATA)>
<!ATTLIST Minor_DTD_Version element_type       CDATA #FIXED 'FIELD'
                            field_type         CDATA #FIXED 'INTEGER'
                            value_lower_range  CDATA #FIXED '0'
                            value_upper_range  CDATA #FIXED '127'>
<!-- ****** -->
<!ELEMENT Time_Of_Generation (Date , Time)>
<!ATTLIST Time_Of_Generation element_tag  CDATA #FIXED '&TIME_OF_GENERATION_TAG;'
                             element_type CDATA #FIXED 'COMPOSITE'>

<!-- ****** -->
<!ELEMENT Date (#PCDATA)>
<!ATTLIST Date element_type     CDATA #FIXED 'FIELD'
               field_type       CDATA #FIXED 'PATTERN'
               element_pattern  CDATA #FIXED '2N(1-12)1H2N(1-31)1H2N(0-99)'>

<!-- ****** -->
<!ELEMENT Time (#PCDATA)>
<!ATTLIST Time element_type     CDATA #FIXED 'FIELD'
               field_type       CDATA #FIXED 'PATTERN'
               element_pattern  CDATA #FIXED '2N(0-23)1:2N(0-59)1:2N(0-59)'>

<!-- ****** -->
<!ELEMENT Report_Content (Transportation_Type?, Driver_Information?, Package_Information?)>
<!ATTLIST Report_Content  element_tag  CDATA #FIXED '&REPORT_CONTENT_TAG;'
                          element_type CDATA #FIXED 'GROUP'>

<!-- ****** -->
<!ELEMENT Transportation_Type ((Truck|Airplane)?, Max_Weight_Capability?,
Delivery_Cycle_Time?)>
<!ATTLIST Transportation_Type element_tag  CDATA #FIXED '&TRANSPORTATION_TYPE_TAG;'
                              element_type CDATA #FIXED 'GROUP'>

<!-- ****** -->
<!ELEMENT Truck (Mileage, Last_Service_Date, License_Number)>
<!ATTLIST Truck element_tag     CDATA #FIXED '&TRUCK_TAG;'
                element_type    CDATA #FIXED 'COMPOSITE'
                path_exclusions CDATA #FIXED '2|3'>

<!-- ****** -->
<!ELEMENT Mileage (#PCDATA)>
<!ATTLIST Mileage reset              (Y|N) 'N'
                  element_type       CDATA #FIXED 'FIELD'
                  field_type         CDATA #FIXED 'INTEGER'
                  value_lower_range  CDATA #FIXED '10'
                  value_upper_range  CDATA #FIXED '1000000'
                  value_qualifier    (LESS_THAN|GREATER_THAN) #IMPLIED>
<!-- ****** -->
<!ELEMENT Last_Service_Date (Date)>
<!ATTLIST Last_Service_Date element_tag  CDATA #FIXED '&LAST_SERVICE_DATE_TAG;'
                            element_type CDATA #FIXED 'COMPOSITE'>
<!-- ****** -->
<!ELEMENT License_Number (#PCDATA)>
<!ATTLIST License_Number element_type     CDATA #FIXED 'FIELD'
                         field_type       CDATA #FIXED 'PATTERN'
                         element_pattern  CDATA #FIXED '7X'>
<!-- ****** -->
```

```
<!ELEMENT Airplane (Flight_Hours, ID_Number, Flight_Type)>
<!ATTLIST Airplane  element_tag   CDATA #FIXED '&AIRPLANE_TAG;'
                    element_type  CDATA #FIXED 'COMPOSITE'>
<!-- ****** -->
<!ELEMENT Flight_Hours (#PCDATA)>
<!ATTLIST Flight_Hours  reset                            (Y|N)  'N'
                        element_type                     CDATA #FIXED 'FIELD'
                        field_type                       CDATA #FIXED 'FLOAT'
                        value_lower_range_exclusive      CDATA #FIXED '0'
                        value_upper_range                CDATA #FIXED '99999'
                        accuracy                         CDATA #IMPLIED>
<!-- ****** -->
<!ELEMENT Flight_Type (#PCDATA)>
<!ATTLIST Flight_Type   reset           (Y|N)  'N'
                        element_type    CDATA #FIXED 'FIELD'
                        field_type      CDATA #FIXED 'ENUMERATED'
                        defined_values  CDATA #FIXED 'NON_STOP=0|ONE_STOP=1|MULTI_STOP=2'>
<!-- ****** -->
<!ELEMENT ID_Number (#PCDATA)>
<!ATTLIST ID_Number     reset              (Y|N)  'N'
                        element_type       CDATA #FIXED 'FIELD'
                        field_type         CDATA #FIXED 'INTEGER'
                        value_lower_range  CDATA #FIXED '1'
                        value_upper_range  CDATA #FIXED '99999'>
<!-- ****** -->
<!ELEMENT Max_Weight_Capability (#PCDATA)>
<!ATTLIST Max_Weight_Capability  reset                         (Y|N)  'N'
                        element_tag                  CDATA #FIXED '&MAX_WEIGHT_CAPABILITY_TAG;'
                        element_type                 CDATA #FIXED 'FIELD'
                        field_type                   CDATA #FIXED 'FLOAT'
                        unit                         (LBS|KG)  #IMPLIED
                        unit_equivalents             CDATA #FIXED 'LBS=1|KG=2'
                        default_unit                 CDATA #FIXED 'LBS'
                        path_1_default_unit          CDATA #FIXED 'LBS'
                        path_2_default_unit          CDATA #FIXED 'KG'
                        value_lower_ranges_exclusive CDATA #FIXED 'LBS=0|KG=0'
                        value_upper_ranges           CDATA #FIXED 'LBS=1000|KG=2000'
                        accuracy                     CDATA #IMPLIED
                        accuracy_lower_ranges        CDATA #FIXED 'LBS=1E-1|KG=1E-1'
                        accuracy_upper_ranges        CDATA #FIXED 'LBS=10E0|KG=10E0'
                        default_accuracies           CDATA #FIXED 'LBS=2|KG=3'
                        path_1_default_accuracies    CDATA #FIXED 'LBS=1|KG=2'
                        path_2_default_accuracies    CDATA #FIXED 'LBS=1|KG=1'>
<!-- ****** -->
<!ELEMENT Delivery_Cycle_Time (#PCDATA)>
<!ATTLIST Delivery_Cycle_Time  reset              (Y|N)  'N'
                        element_tag        CDATA #FIXED '&DELIVERY_CYCLE_TIME_TAG;'
                        element_type       CDATA #FIXED 'FIELD'
                        field_type         CDATA #FIXED 'INTEGER'
                        value_lower_range  CDATA #FIXED '0'
                        value_upper_range  CDATA #FIXED '24'
                        unit               (HOURS)  #IMPLIED
                        default_unit       CDATA #FIXED 'HOURS'>
<!-- ****** -->
<!ELEMENT Driver_Information (Name?, Employee_Number?, Route_Delivery_Number+)>
<!ATTLIST Driver_Information  element_tag   CDATA #FIXED '&DRIVER_INFORMATION_TAG;'
                              element_type  CDATA #FIXED 'GROUP'>
<!-- ****** -->
<!ELEMENT Name (#PCDATA)>
<!ATTLIST Name  reset              (Y|N)  'N'
                element_tag        CDATA #FIXED '&NAME_TAG;'
                element_type       CDATA #FIXED 'FIELD'
                field_type         CDATA #FIXED 'STRING'
                value_min_length   CDATA #FIXED '1'
```

```
                    value_max_length  CDATA #FIXED '50'>
<!-- ******  -->
<!ELEMENT Employee_Number  (#PCDATA)>
<!ATTLIST Employee_Number  reset                 (Y|N)  'N'
                           element_tag           CDATA #FIXED '&EMPLOYEE_NUMBER_TAG;'
                           element_type          CDATA #FIXED 'FIELD'
                           field_type            CDATA #FIXED 'INTEGER'
                           value_lower_range     CDATA #FIXED '0'
                           value_upper_range     CDATA #FIXED '9999'>
<!-- ******  -->
<!ELEMENT Route_Delivery_Number  (#PCDATA)>
<!ATTLIST Route_Delivery_Number  reset           (Y|N)  'N'
                                 element_tag     CDATA #FIXED '&ROUTE_DELIVERY_NUMBER_TAG;'
                                 element_type    CDATA #FIXED 'FIELD'
                                 field_type      CDATA #FIXED 'PATTERN'
                                 element_pattern CDATA #FIXED '2A(A-Z)5N(0-99999)'>
<!-- ******  -->
<!ELEMENT Package_Information  ((Package_Delivery, Delivery_Address)*)>
<!ATTLIST Package_Information  reset                  (Y|N)  'N'
                               element_tag            CDATA #FIXED '&PACKAGE_INFORMATION_TAG;'
                               element_type           CDATA #FIXED 'REPETITIVE'
                               element_iterations     CDATA #REQUIRED
                               min_element_iterations CDATA #FIXED '1'
                               max_element_iterations CDATA #FIXED '100' >
<!-- ******  -->
<!ELEMENT Package_Delivery ((Box, Handling_Instructions, Receipt_Instructions,
Tracking_Number)*)>
<!ATTLIST Package_Delivery  reset                  (Y|N)  'N'
                            element_tag            CDATA #FIXED '&PACKAGE_DELIVERY_TAG;'
                            element_type           CDATA #FIXED 'REPETITIVE'
                            element_iterations     CDATA #REQUIRED
                            min_element_iterations CDATA #FIXED '1'
                            max_element_iterations CDATA #FIXED '999' >
<!-- ******  -->
<!ELEMENT Box  (Dimensions, Weight)>
<!ATTLIST Box  reset        (Y|N) 'N'
               element_tag  CDATA #FIXED '&BOX_TAG;'
               element_type CDATA #FIXED 'COMPOSITE'>
<!-- ******  -->
<!ELEMENT Dimensions  (Width, Depth, Height)>
<!ATTLIST Dimensions  reset        (Y|N)  'N'
                      element_tag  CDATA #FIXED '&DIMENSIONS_TAG;'
                      element_type CDATA #FIXED 'COMPOSITE'>
<!-- ******  -->
<!ELEMENT Width  (#PCDATA)>
<!ATTLIST Width  reset                        (Y|N)  'N'
                 element_type                 CDATA #FIXED 'FIELD'
                 field_type                   CDATA #FIXED 'FLOAT'
                 unit                         (INCHES|CM)  #IMPLIED
                 unit_equivalents             CDATA #FIXED 'INCHES=1|CM=2'
                 default_unit                 CDATA #FIXED 'INCHES'
                 path_1_default_unit          CDATA #FIXED 'INCHES'
                 path_2_default_unit          CDATA #FIXED 'CM'
                 value_lower_ranges_exclusive CDATA #FIXED 'INCHES=0|CM=0'
                 value_upper_ranges           CDATA #FIXED 'INCHES=2000|CM=4000'
                 value_qualifier              (GREATER_THAN|LESS_THAN) #IMPLIED
                 accuracy                     CDATA #IMPLIED
                 accuracy_lower_ranges        CDATA #FIXED 'INCHES=1E0|CM=1E0'
                 accuracy_upper_ranges        CDATA #FIXED 'INCHES=10E0|CM=10E0'
                 path_1_default_accuracies    CDATA #FIXED 'INCHES=1|CM=2'
                 path_2_default_accuracies    CDATA #FIXED 'INCHES=1|CM=1'>
<!-- ******  -->
<!ELEMENT Depth  (#PCDATA)>
<!ATTLIST Depth  reset                        (Y|N)  'N'
```

```
                    element_type               CDATA #FIXED 'FIELD'
                    field_type                 CDATA #FIXED 'FLOAT'
                    unit                       (INCHES|CM) #IMPLIED
                    unit_equivalents           CDATA #FIXED 'INCHES=1|CM=2'
                    default_unit               CDATA #FIXED 'INCHES'
                    path_1_default_unit        CDATA #FIXED 'INCHES'
                    path_2_default_unit        CDATA #FIXED 'CM'
                    value_lower_ranges_exclusive CDATA #FIXED 'INCHES=0|CM=0'
                    value_upper_ranges         CDATA #FIXED 'INCHES=2000|CM=4000'
                    value_qualifier            (GREATER_THAN|LESS_THAN) #IMPLIED
                    accuracy                   CDATA #IMPLIED
                    accuracy_lower_ranges      CDATA #FIXED 'INCHES=1E0|CM=1E0'
                    accuracy_upper_ranges      CDATA #FIXED 'INCHES=10E0|CM=10E0'
                    path_1_default_accuracies  CDATA #FIXED 'INCHES=1|CM=2'
                    path_2_default_accuracies  CDATA #FIXED 'INCHES=1|CM=1'>
<!-- ******   -->
<!ELEMENT Height  (#PCDATA)>
<!ATTLIST Height  reset                      (Y|N) 'N'
                    element_type               CDATA #FIXED 'FIELD'
                    field_type                 CDATA #FIXED 'FLOAT'
                    unit                       (INCHES|CM) #IMPLIED
                    unit_equivalents           CDATA #FIXED 'INCHES=1|CM=2'
                    default_unit               CDATA #FIXED 'INCHES'
                    path_1_default_unit        CDATA #FIXED 'INCHES'
                    path_2_default_unit        CDATA #FIXED 'CM'
                    value_lower_ranges_exclusive CDATA #FIXED 'INCHES=0|CM=0'
                    value_upper_ranges         CDATA #FIXED 'INCHES=4000|CM=8000'
                    value_qualifier            (GREATER_THAN|LESS_THAN) #IMPLIED
                    accuracy                   CDATA #IMPLIED
                    accuracy_lower_ranges      CDATA #FIXED 'INCHES=1E0|CM=1E0'
                    accuracy_upper_ranges      CDATA #FIXED 'INCHES=10E0|CM=10E0'
                    path_1_default_accuracies  CDATA #FIXED 'INCHES=1|CM=2'
                    path_2_default_accuracies  CDATA #FIXED 'INCHES=1|CM=1'>
<!-- ******   -->
<!ELEMENT Weight  (#PCDATA)>
<!ATTLIST Weight  reset                      (Y|N) 'N'
                    element_type               CDATA #FIXED 'FIELD'
                    field_type                 CDATA #FIXED 'FLOAT'
                    unit                       (LBS|KG) #IMPLIED
                    unit_equivalents           CDATA #FIXED 'LBS=1|KG=2'
                    default_unit               CDATA #FIXED 'LBS'
                    path_1_default_unit        CDATA #FIXED 'LBS'
                    path_2_default_unit        CDATA #FIXED 'KG'
                    value_lower_ranges_exclusive CDATA #FIXED 'LBS=0|KG=0'
                    value_upper_ranges         CDATA #FIXED 'LBS=2000|KG=4000'
                    value_qualifier            (GREATER_THAN|LESS_THAN) #IMPLIED
                    accuracy                   CDATA #IMPLIED
                    accuracy_lower_ranges      CDATA #FIXED 'LBS=1E0|KG=1E0'
                    accuracy_upper_ranges      CDATA #FIXED 'LBS=10E0|KG=10E0'
                    path_1_default_accuracies  CDATA #FIXED 'LBS=1|KG=2'
                    path_2_default_accuracies  CDATA #FIXED 'LBS=1|KG=1'>
<!-- ******   -->
<!ELEMENT Handling_Instructions  (Fragile, Upright_Only, Two_Man_Lift)>
<!ATTLIST Handling_Instructions  reset       (Y|N) 'N'
                    element_tag   CDATA #FIXED '&HANDLING_INSTRUCTIONS_TAG;'
                    element_type  CDATA #FIXED 'PACKED'>
<!-- ******   -->
<!ELEMENT Fragile  (#PCDATA)>
<!ATTLIST Fragile  reset              (Y|N) 'N'
            element_type   CDATA #FIXED 'FIELD'
            field_type     CDATA #FIXED 'PACKED_COMPONENT'
            defined_values CDATA #FIXED 'YES=1|NO=2'
            default_value  CDATA #FIXED 'NO'>
<!-- ******   -->
```

```
<!ELEMENT Upright_Only  (#PCDATA)>
<!ATTLIST Upright_Only  reset           (Y|N)  'N'
                        element_type    CDATA  #FIXED 'FIELD'
                        field_type      CDATA  #FIXED 'PACKED_COMPONENT'
                        defined_values  CDATA  #FIXED 'YES=1|NO=2'
                        default_value   CDATA  #FIXED 'NO'>
<!-- ****** -->
<!ELEMENT Two_Man_Lift  (#PCDATA)>
<!ATTLIST Two_Man_Lift  reset           (Y|N)  'N'
                        element_type    CDATA  #FIXED 'FIELD'
                        field_type      CDATA  #FIXED 'PACKED_COMPONENT'
                        defined_values  CDATA  #FIXED 'YES=1|NO=2'
                        default_value   CDATA  #FIXED 'NO'>
<!-- ****** -->
<!ELEMENT Receipt_Instructions  (Open_Instructions, Additional_Boxes, Private)>
<!ATTLIST Receipt_Instructions  reset        (Y|N)  'N'
                                element_tag  CDATA  #FIXED '&RECEIPT_INSTRUCTIONS_TAG;'
                                element_type CDATA  #FIXED 'PACKED'>
<!-- ****** -->
<!ELEMENT Open_Instructions  (#PCDATA)>
<!ATTLIST Open_Instructions  reset           (Y|N)  'N'
                             element_type    CDATA  #FIXED 'FIELD'
                             field_type      CDATA  #FIXED 'PACKED_COMPONENT'
                             defined_values  CDATA  #FIXED 'OPEN_IMMEDIATELY=1|NORMAL_OPEN=2'
                             default_value   CDATA  #FIXED 'NORMAL_OPEN'>
<!-- ****** -->
<!ELEMENT Additional_Boxes  (#PCDATA)>
<!ATTLIST Additional_Boxes  reset           (Y|N)  'N'
                            element_type    CDATA  #FIXED 'FIELD'
                            field_type      CDATA  #FIXED 'PACKED_COMPONENT'
                            defined_values  CDATA  #FIXED 'YES=1|NO=2'
                            default_value   CDATA  #FIXED 'NO'>
<!-- ****** -->
<!ELEMENT Private  (#PCDATA)>
<!ATTLIST Private  reset           (Y|N)  'N'
                   element_type    CDATA  #FIXED 'FIELD'
                   field_type      CDATA  #FIXED 'PACKED_COMPONENT'
                   defined_values  CDATA  #FIXED 'YES=1|NO=2'
                   default_value   CDATA  #FIXED 'NO'>
<!-- ****** -->
<!ELEMENT Tracking_Number  (#PCDATA)>
<!ATTLIST Tracking_Number  reset            (Y|N)  'N'
                           element_type     CDATA  #FIXED 'FIELD'
                           field_type       CDATA  #FIXED 'PATTERN'
                           element_pattern  CDATA  #FIXED '5[3A(A-G)2N(0-76)][3A(H-Z)2N(77-99)]'>
<!-- ****** -->
<!ELEMENT Delivery_Address  (Street , City , State , Zip_Code)>
<!ATTLIST Delivery_Address  reset         (Y|N)  'N'
                            element_tag   CDATA  #FIXED '&DELIVERY_ADDRESS_TAG;'
                            element_type  CDATA  #FIXED 'COMPOSITE'>
<!-- ****** -->
<!ELEMENT Street  (#PCDATA)>
<!ATTLIST Street  reset             (Y|N)  'N'
                  element_type      CDATA  #FIXED 'FIELD'
                  field_type        CDATA  #FIXED 'STRING'
                  value_min_length  CDATA  #FIXED '1'
                  value_max_length  CDATA  #FIXED '50'>
<!-- ****** -->
<!ELEMENT City  (#PCDATA)>
<!ATTLIST City  reset             (Y|N)  'N'
                element_type      CDATA  #FIXED 'FIELD'
                field_type        CDATA  #FIXED 'STRING'
                value_min_length  CDATA  #FIXED '1'
                value_max_length  CDATA  #FIXED '50'>
```

```
<!--  ******   -->
<!ELEMENT State    (#PCDATA)>
<!ATTLIST State    reset              (Y|N)  'N'
                   element_type       CDATA  #FIXED  'FIELD'
                   field_type         CDATA  #FIXED  'STRING'
                   value_min_length   CDATA  #FIXED  '2'
                   value_max_length   CDATA  #FIXED  '2'
                   defined_values     CDATA  #FIXED  '%state_abbreviation_file;'>
<!--  ******   -->
<!ELEMENT Zip_Code (#PCDATA)>
<!ATTLIST Zip_Code reset              (Y|N)  'N'
                   element_type       CDATA  #FIXED  'FIELD'
                   field_type         CDATA  #FIXED  'PATTERN'
                   element_pattern    CDATA  #FIXED  '5N'>
```

A.2.2  Package_Delivery_System External Mnemonics File

The example Package_Delivery_System XML data utilizes one external file named "state_abbreviation_file.txt" in a directory named "CMF_Mnemonics" which must be a direct sub-directory of the directory containing the DTD. Table A2.1-2 lists example contents of the example external file.

Table A.2.2-1 Package_Delivery_System External Mnemonics File Listing

AB|AL|AR|TX

Appendix B - CMF Data Examples

The following examples provide a representative example of the defined capabilities using the DTD provided in Appendix A.

B.1  Combined CMF-X and CMF-B Example

The example in Table B.1-1 has the CMF-X representation on the left of the page and the CMF-B representation on the right. This was provided in this manner for several reasons. This format makes reading and understanding both formats much easier and more comprehensible. Also, since the CMF-B is actually enclosed within XML comment markers, the example can be processed by an actual XML parser to check the CMF-X portion for being "well-formed" and "valid". If the example and the DTD listings from Appendix A are extracted and placed into text-based files by themselves, the XML can also be displayed using an XML capable browser.

The comments interspersed in italics within the CMF-X side are actually the DTD content models for the respective elements. These are present to provide a direct reference to the elements' required, optional, and repeatable sub-elements. Likewise next to portions of the binary representations within the CMF-B some of the actual characters or decimal value equivalents have been provided within parenthesis. Obviously actual CMF-X and CMF-B would not actually be provided together in this format nor would the added comment material be present.

Table B.1-1 Combined CMF-X and CMF-B Example Listing

| CMF-X (on left) | CMF-B equivalent (on right) | | |
|---|---|---|---|
| `<?xml version="1.0"?>` | | | |
| `<!DOCTYPE CMF_Doc SYSTEM "Package_Delivery_System.dtd">` | | | |
| `<!--` | | | `-->` |
| `<CMF_Doc>` | `<!-- 1-0000001(1)` | `0-0000001` | `1-1000010(194) (194 bytes) ... -->` |
| `<!-- (Package_Description_Data, Time_Of_Generation, Report_Content*) -->` | | | |
| `<Package_Description_Data>` | `<!-- 1-1100100(100)` | | `-->` |
| `<Major_Parser_API_Version>1</Major_Parser_API_Version>` | `<!--` | `1-0000001(1)` | `-->` |
| `<Minor_Parser_API_Version>0</Minor_Parser_API_Version>` | `<!--` | `1-0000000(0)` | `-->` |
| `<Major_DTD_Version>1</Major_DTD_Version>` | `<!--` | `1-0000001(1)` | `-->` |
| `<Minor_DTD_Version>1</Minor_DTD_Version>` | `<!--` | `1-0000001(1)` | `-->` |
| `</Package_Description_Data>` | | | |
| `<Time_Of_Generation>` | `<!-- 1-0000010(2)` | `1-0000010(2)` | `1-0101101(-) 1-0011010(26) -->` |
| `<Date>02-26-01</Date>` | `<!--` | `1-0101101(-)` | `1-0000001(1) -->` |
| `<Time>08:10:20</Time>` | `<!--` | `1-0001000(8)` | `1-0011010(:) -->` |
| | `<!--` | `1-0011010(:)` | `1-0010100(20) -->` |
| `</Time_Of_Generation>` | | | |
| `<Report_Content>` | `<!-- 1-0000011(3)` | `0-0000001` | `1-0100110(166) (166 bytes) -->` |
| `<!-- (Transportation_Type?, Driver_Information?, Package_Information) -->` | | | |
| `<Transportation_Type>` | `<!-- 1-0000100(4)` | `1-0010111(23)` | `(23 bytes) -->` |
| `<!-- ((Truck | Airplane)?, Max_Weight_Capability?, Delivery_Cycle_Time?) -->` | | | |
| `<Truck>` | `<!-- 1-0000101(5)` | `0-0000111` | `1-1101000(1000) -->` |
| `<Mileage>1000</Mileage>` | | | |
| `<Last_Service_Date>` | `<!--` | `1-0001100(12)` | `1-0101101(-) 1-0001010(10) -->` |
| `<Date>12-10-00</Date>` | `<!--` | `1-0101101(-)` | `1-0000000(0) -->` |
| `</Last_Service_Date>` | | | |
| `<License_Number>BR54900</License_Number>` | `<!--` | `0-1000010(B)` | `0-1010010(R) 0-0110101(5) -->` |
| | `<!--` | `0-0110100(4)` | `0-0110011(9) 0-0110000(0) -->` |
| | `<!--` | `1-0110000(0)` | `-->` |
| `</Truck>` | | | |
| `<Max_Weight_Capability unit="LBS" accuracy="5E-1">1</Max_Weight_Capability>` | `<!-- 1-0000111(7)` | | `-->` |

```
<!--                                                        0-0000000   1-0100000
                                          1-0000001         1-0100001(1E0, acc. 5E-1)  ↑ ↑
                                          1-0000101,                                   ↑ ↑
<Delivery_Cycle_Time unit="HOURS">22</Delivery_Cycle_Time>
                          <!-- 1-0001000(8)  1-0010110(22)                             ↑

</Transportation_Type>

<Driver_Information>
<!-- (Name? , Employee_Number? , Route_Delivery_Number*) -->
                          <!-- 1-0001001(9)  1-0011000(24)  (24 bytes)                 ↑

<Name>JOHN DOE</Name>
                          <!-- 1-0001010(10)                                           ↑ ↑ ↑
                                         0-1001010(J)     0-1001111(O)    0-1001000(H) ↑ ↑ ↑ ↑
                                         0-1001110(N)     0-1000000(SPC)  0-1001000(D)
                                         0-1001111(O)     1-1001101(E)
<Employee_Number>1364</Employee_Number>
                         <!-- 1-0001011(11)   0-0001010    1-1010100(1364)             ↑

<Route_Delivery_Number>AA53000</Route_Delivery_Number>
                         <!-- 1-0001100(12)   0-1000001(A)   1-1000001(A)  0-0000011   ↑ ↑ ↑ ↑ ↑ ↑ ↑ ↑
                                              0-0011110      1-0001000(53000)

<Route_Delivery_Number>AA54000</Route_Delivery_Number>
                         <!-- 1-0001100(12)   0-1000001(A)   1-1000001(A)  0-0000011   ↑ ↑ ↑ ↑ ↑ ↑ ↑ ↑
                                              0-0100101      1-1110000(54000)

</Driver_Information>

<Package_Information element_iterations="2">
                         <!-- 1-0001101(13)   1-0000010(2)                             ↑

<Package_Delivery element_iterations="2">
                         <!-- 1-0000010(2)                                             ↑

<Box>
    <Dimensions>
      <Width unit="INCHES" accuracy="1">5E0</Width>
                         <!-- 1-0000101       1-0000000(5E0)                           ↑ ↑ ↑
      <Depth unit="INCHES" accuracy="1">6E1</Depth>
                         <!-- 1-0000110       1-0000001(6E1)                           ↑
      <Height unit="INCHES" accuracy="1">7E1</Height>
                         <!-- 1-0000111       1-0000001(7E1)
    </Dimensions>
    <Weight unit="LBS" accuracy="1">10E2</Weight>
                         <!-- 1-0001010       1-0000010(10E2)                          ↑
  </Box>
  <Handling_Instructions>
    <Fragile>NO</Fragile>                1-1                                           ↑ ↑ ↑ ↑
    <Upright_Only>YES</Upright_Only>     11(Default)
    <Two_Man_Lift>NO</Two_Man_Lift>      01(1)
  </Handling_Instructions>               11(Default)
```

| XML | Col1 | Col2 | Col3 | Col4 |
|---|---|---|---|---|
| <Receipt_Instructions> | ← | | | ↑ |
|   <Open_Instructions>OPEN_IMMEDIATELY</Open_Instructions> | ← | 1-1 | | ↑ |
|   <Additional_Boxes>NO</Additional_Boxes> | ← | 01(1) | | ↑ |
|   <Private>NO</Private> | ← | 11(Default) | | ↑ |
| </Receipt_Instructions> | ← | 11(Default) | | |
| | | | | |
| <Tracking_Number>ABC22</Tracking_Number> | ← | 0-1000001(A) | 0-1000010(B) | 1-1000011(C) ↑ |
| | ← | 1-1001110(22) | | |
| <Box> | | | | |
|   <Dimensions> | | | | |
|     <Width unit="CM" accuracy="1">5E0</Width> | ← | 1-0000101 | 0-0000000 | 1-1100000 ↑ |
| | ← | 1-0000010 | 1-0000001 | 0-0000000 ↑ |
| | | (5E0, unit=2, acc=1E0) | | |
|     <Depth unit="INCHES" accuracy="2E0">6E1</Depth> | ← | 1-0000110 | 0-0000000 | 1-0100001 ↑ |
| | ← | 1-0000010 | 1-0000000 (6E1, acc=2E0) | |
|     <Height unit="CM" accuracy="2E0">7E1</Height> | ← | 1-0000111 | 0-0000000 | 1-1100001 ↑ |
| | ← | 1-0000010 | 1-0000010 | 0-0000000 ↑ |
| | | (7E1, unit=2, acc=2E0) | | |
|   </Dimensions> | | | | |
|   <Weight unit="LBS" accuracy="1" value_qualifier="GREATER_THAN">10E2</Weight> | ← | 1-0001010 | 0-0000000 | 0-0000000 ↑ |
| | ← | 1-0100010 (10E2, GT) | | |
| </Box> | | | | |
| | | | | |
| <Handling_Instructions> | ← | | | ↑ |
|   <Fragile>YES</Fragile> | ← | 1-1 | | ↑ |
|   <Upright_Only>NO</Upright_Only> | ← | 01(1) | | ↑ |
|   <Two_Man_Lift>NO</Two_Man_Lift> | ← | 11(Default) | | ↑ |
| </Handling_Instructions> | ← | 11(Default) | | |
| | | | | |
| <Receipt_Instructions> | ← | | | |
|   <Open_Instructions>OPEN_IMMEDIATELY</Open_Instructions> | ← | 1-1 | | |
|   <Additional_Boxes>NO</Additional_Boxes> | ← | 01(1) | | |
|   <Private>NO</Private> | ← | 11(Default) | | |
| </Receipt_Instructions> | ← | 11(Default) | | |
| | | | | |
| <Tracking_Number>JKL78</Tracking_Number> | ← | 0-1001010(J) | 0-1001011(K) | 1-1001100(L) ↑ |
| | ← | 1-1001110(78) | | |
| </Package_Delivery> | | | | |
| | | | | |
| <Delivery_Address> | | | | |

| XML | Binary |
|---|---|
| `<Street>123 PINE</Street>` | 0-0110001(1) 0-0110010(2) 0-0110011(3) → → → |
| | 0-0100000(SPC) 0-0101000(P) 0-101001(I) → → |
| | 0-1001110(N) 1-1000101(E) |
| `<City>GREENVILLE</City>` | 0-1000111(G) 0-1010010(R) 0-100101(E) → → |
| | 0-1000101(E) 0-1001110(N) 0-101110(V) → → |
| | 0-1001001(I) 0-1001100(L) 0-100100(L) → → |
| | 1-1000101(E) |
| `<State>TX</State>` | 0-1010100(T) 1-101000(X) |
| `<Zip_Code>75402</Zip_Code>` | 0-0000100 0-1001101 1-001010(75402) → |
| `</Delivery_Address>` | |
| | |
| `<Package_Delivery element_iterations="1">` | 1-0000001(1) → |
| `<Box>` | |
| `<Width unit="INCHES" accuracy="1" value_qualifier="LESS_THAN">5E0</Width>` | 1-0000101 0-0000000 0-0100000 → |
| | 1-1000000 (5E0, LT) ↳ |
| `<Depth unit="CM" accuracy="1" value_qualifier="LESS_THAN">6E1</Depth>` | 1-0000110 0-0000000 0-1100000 → |
| | 1-1000001 1-0000010 1-0000001 → |
| | 1-0000000 (6E1, unit=2, acc=1E0, LT) |
| `<Height unit="INCHES" accuracy="1">200E1</Height>` | 0-0000001 1-1001000 1-0000001 → |
| `</Dimensions>` | |
| `<Weight unit="KG" accuracy="2" value_qualifier="LESS_THAN">250E0</Weight>` | 0-0000001 1-1111010 0-0000000 → |
| | 0-1000000 1-1000000 1-0000010 → |
| | (250E0, unit=2, LT) |
| `</Box>` | |
| `<Handling_Instructions reset="Y">` | 0-0000000(Reset) → |
| `<Fragile reset="Y" />` | |
| `<Upright_Only reset="Y" />` | |
| `<Two_Man_Lift reset="Y" />` | |
| `</Handling_Instructions>` | |
| `<Receipt_Instructions>` | |
| `<Open_Instructions>OPEN_IMMEDIATELY</Open_Instructions>` | 1-1 |
| `<Additional_Boxes>NO</Additional_Boxes>` | 01(1) |
| `<Private>YES</Private>` | 11(Default) |
| `</Receipt_Instructions>` | 01(1) |
| `<Tracking_Number>AD676</Tracking_Number>` | 0-1000001(A) 0-1000100(D) 1-1000111(G) → |

| | | | | | |
|---|---|---|---|---|---|
| `</Package_Delivery>` | ←|-- | | | | |
| `<Delivery_Address>` | ←|-- | 1-1001100(76) | | | ↑ |
| `<Street>456 MAPLE</Street>` | ←|-- | | 0-0010100(4) | 0-0110101(5) | 0-0110110(6) ↑ |
| | | | 0-010000(SPC) | 0-1001101(M) | 0-1000001(A) ↑ |
| | | | 0-0101000(P) | 0-1001100(L) | 1-1000101(E) ↑ |
| `<City>HAMBURG</City>` | ←|-- | | 0-1001000(H) | 0-1000001(A) | 0-1001101(M) ↑ |
| | | | 0-1000010(B) | 0-1010101(U) | 0-1010010(R) ↑ |
| | | | 1-1000111(G) | | |
| `<State>AR</State>` | ←|-- | | 0-1000001(A) | 1-1010010(R) | |
| `<Zip_Code>71234</Zip_Code>` | ←|-- | | 0-000010 | 0-0101100 | 1-1000010(71234) → |
| `</Delivery_Address>` | ←|-- | | | | |
| | | | | | |
| `</Package_Information>` | | | | | |
| | | | | | |
| `</Report_Content>` | | | | | |
| `<Report_Content>` | ←|-- | 1-0000011(3) | 1-0000111(7) | | (7 bytes) ↑ |
| `<Transportation_Type>` | ←|-- | 1-0000100(4) | 1-0000101(5) | | (5 bytes) ↑ |
| `<Airplane>` | ←|-- | 1-0000110(6) | | | |
| `<Flight_Hours accuracy="1">20</Flight_Hours>` | ←|-- | | 1-0010100 | 1-0000000 (20E0) | ↑ ↑ ↑ ↑ |
| `<ID_Number>120</ID_Number>` | ←|-- | | 1-1111000(120) | | |
| `<Flight_Type>NON_STOP</Flight_Type>` | ←|-- | | 1-0000000(0) | | |
| `</Airplane>` | | | | | |
| | | | | | |
| `</Transportation_Type>` | | | | | |
| | | | | | |
| `</Report_Content>` | | | | | |
| | | | | | |
| `</CMF_Doc>` | | | | | |

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A system configured to transmit data packets including data formatted in a binary extensible markup language (XML), comprising:
   a parser configured to convert from an extensible markup language (XML) representation that is compatible with standard XML and includes element start tags, element end tags and data values to a single data stream binary representation by providing binary data representations for element start tags and data values within the XML representation and by not providing binary data representations for element end tags within the XML representation, wherein the binary data representations are each formed using X-bit bytes, and wherein consistent extensible encoding is provided for each binary data representation by using a most-significant-bit of each X-bit byte as a termination indicator bit where a first logic level indicates the byte is a termination byte and a second logic level indicates that more bytes are included in a multi-byte data word, and wherein the XML representation and the binary representation are defined according to document type definition (DTD);
   a data storage system;
   a data packager within the parser, the data packager being configured to create data packets for the single data stream binary representation that is formed using the X-bit bytes, and
   a first interface coupled to the parser and configured to transmit the data packets for the single data stream binary representation through a data channel to a second interface associated with a second system;
   wherein the element start tags are represented using positive integer binary data representations; and
   wherein the data values are represented using binary data representations selected from a group comprising a string, an integer, a floating point number, an enumerated value, a pattern, and a packed component.

2. The system of claim 1, wherein the second system comprises a data storage system.

3. The system of claim 1, wherein the data values are represented using binary data representations selected from a group consisting of a string, an integer, a floating point number, an enumerated value, a pattern, and a packed component.

4. The system of claim 1, wherein the first logic level is a logic "1" and the second logic level is a logic "0", and wherein all zeros in an X-bit byte represents a data reset.

5. A system configured to receive data packets including data formatted in a binary extensible markup language (XML), comprising:
   a parser configured to convert to an extensible markup language (XML) representation that is compatible with standard XML and includes element start tags, element end tags and data values from a single data stream binary representation including binary data representations for element start tags and data values within the XML representation and not including binary data representations for element end tags within the XML representation, wherein the binary data representations are each formed using X-bit bytes, and wherein consistent extensible encoding is provided for the binary data representations by using a most-significant-bit of each X-bit byte as a termination indicator bit where a first logic level indicates the byte is a termination byte and a second logic level indicates that more bytes are included in a multi-byte data word; and wherein the XML representation and the binary representation are defined according to a document type definition (DTD);
   a data storage system;
   a first interface configured to receive data packets including the X-bit bytes for the single data stream binary representation through a data channel from a second interface associated with a second system; and
   a data converter within the parser, the data converter being configured to receive the data packets for the single data stream binary representation and to convert the data packets to the XML representation;
   wherein the element start tags are represented using positive integer binary data representations; and
   wherein the data values are represented using binary data representations selected from a group comprising a string, an integer, a floating point number, an enumerated value, a pattern, and a packed component.

6. The system of claim 5, wherein the second system comprises a data storage system.

7. The system of claim 5, wherein the data values are represented using binary data representations selected from a group consisting of a string, an integer, a floating point number, an enumerated value, a pattern, and a packed component.

8. The system of claim 5, wherein the first logic level is a logic "1" and the second logic level is a logic "0", and wherein all zeros in an X-bit byte represents a data reset.

9. A method for transmitting data packets including data formatted in an binary extensible markup language (XML) from a first system to a second system, comprising:
   providing a parser configured to convert from an extensible markup language (XML) representation that is compatible with standard XML to an extensible binary representation that is configured to reduce a number of bits required to represent common data as compared to the XML representation;
   accessing an XML representation according to a document type definition (DTD), the XML representation including element start tags, element end tags and data values;
   parsing the XML representation to generate a single data stream binary representation of the XML representation by providing binary data representations for element start tags and data values and by not providing binary data representations for element end tags; wherein the binary data representations are each formed using X-bit bytes; and wherein consistent extensible encoding is provided for each binary data representation by using a most-significant-bit of each X-bit byte as a termination indicator bit where a first logic level indicates the byte is a termination byte and a second logic level indicates that more bytes are included in a multi-byte data word;
   generating data packets for the single data stream binary representation that is formed using the X-bit bytes; and transmitting the data packets for the single data stream binary representation from a first interface associated with a first system through a data channel to a second interface associated with a second system;

wherein the element start tags are represented using positive integer binary data representations; and wherein the data values are represented using binary data representations selected from a group comprising a string, an integer, a floating point number, an enumerated value, a pattern, and a packed component.

10. The method of claim 9, wherein the first system comprises a data storage system.

11. The method of claim 9, wherein the second system comprises a data storage system.

12. The method of claim 9, wherein the data values are represented using binary data representations selected from a group consisting of a string, an integer, a floating point number, an enumerated value, a pattern, and a packed component.

13. The method of claim 9, wherein the first logic level is a logic "1" and the second logic level is a logic "0", and wherein all zeros in an X-bit byte represents a data reset.

14. A method for receiving data packets including data formatted in an binary extensible markup language (XML) at a first system from a second system, comprising:

providing a parser configured to convert to an extensible markup language (XML) representation that is compatible with standard XML from an extensible binary representation that is configured to reduce a number of bits required to represent common data as compared to the XML representation; wherein the XML representation is defined according to a document type definition (DTD) and includes element start tags, element end tags and data values;

receiving data packets for a single data stream binary representation of an XML representation with a first interface associated with a first system through a data channel from a second interface associated with a second system; wherein the single data stream binary representation of the XML representation includes binary data representations for element start tags and data values and does not include binary data representations for element end tags; wherein the binary data representations are each formed using X-bit bytes; and wherein consistent extensible encoding is provided for each binary data representation by using a most-significant-bit of each X-bit byte as a termination indicator bit where a first logic level indicates the byte is a termination byte and a second logic level indicates that more bytes are included in a multi-byte data word; and parsing the single data stream binary representation to generate the XML representation;

wherein the element start tags are represented using positive integer binary data representations; and wherein the data values are represented using binary data representations selected from a group comprising a string, an integer, a floating point number, an enumerated value, a pattern, and a packed component.

15. The method of claim 14, wherein the first system comprises a data storage system.

16. The method of claim 14, wherein the second system comprises a data storage system.

17. The method of claim 14, wherein the data values are represented using binary data representations selected from a group consisting of a string, an integer, a floating point number, an enumerated value, a pattern, and a packed component.

18. The method of claim 14, wherein the first logic level is a logic "1" and the second logic level is a logic "0", and wherein all zeros in an X-bit byte represents a data reset.

* * * * *